(12) United States Patent
Kang et al.

(10) Patent No.: US 10,419,095 B2
(45) Date of Patent: Sep. 17, 2019

(54) METHOD FOR CONFIGURING CHANNEL STATE INFORMATION USING POLARIZATION CHARACTERISTICS OF ANTENNA IN WIRELESS COMMUNICATION SYSTEM AND DEVICE THEREFOR

(71) Applicant: LG ELECTRONICS INC., Seoul (KR)

(72) Inventors: Jiwon Kang, Seoul (KR); Kitae Kim, Seoul (KR); Kilbom Lee, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/529,958

(22) PCT Filed: Jun. 23, 2015

(86) PCT No.: PCT/KR2015/006357
§ 371 (c)(1),
(2) Date: May 25, 2017

(87) PCT Pub. No.: WO2016/111427
PCT Pub. Date: Jul. 14, 2016

(65) Prior Publication Data
US 2017/0331541 A1    Nov. 16, 2017

Related U.S. Application Data

(60) Provisional application No. 62/099,595, filed on Jan. 5, 2015.

(51) Int. Cl.
*H04L 12/28*    (2006.01)
*H04B 7/06*    (2006.01)
(Continued)

(52) U.S. Cl.
CPC ......... *H04B 7/0626* (2013.01); *H04B 7/0469* (2013.01); *H04B 7/0634* (2013.01);
(Continued)

(58) Field of Classification Search
CPC ...... H04B 7/0874; H01Q 13/06; H01Q 1/241; H01Q 3/34; H01Q 1/28
See application file for complete search history.

(56) References Cited

U.S. PATENT DOCUMENTS

2011/0103504 A1    5/2011    Ma
2011/0170638 A1*   7/2011    Yuan ................... H04B 7/0626
                                                              375/340
(Continued)

FOREIGN PATENT DOCUMENTS

WO    2014107012    7/2014
WO    2014168319    10/2014

OTHER PUBLICATIONS

PCT International Application No. PCT/KR2015/006358, Written Opinion of the International Searching Authority dated Oct. 12, 2015, 18 pages.
(Continued)

*Primary Examiner* — Abdelillah Elmejjarmi
(74) *Attorney, Agent, or Firm* — Lee Hong Degerman Kang & Waimey

(57) ABSTRACT

The present application discloses a method for a terminal reporting channel state information to a base station in a wireless communication system. Specifically, the method comprises the steps of: receiving, from a base station, a first reference signal corresponding to a row of a transmission antenna array, and a second reference signal corresponding to a column of the transmission antenna array; receiving, from the base station, a cross polarization characteristics measurement indicator; and reporting, to the base station,
(Continued)

channel state information comprising a first precoder corresponding to the first reference signal and a second precoder corresponding to the second reference signal, wherein the channel state information comprises cross polarization characteristics information between antenna ports that have the same indexes, the antenna ports being among antenna ports having the first reference signal and the second reference signal transmitted.

4 Claims, 19 Drawing Sheets

(51) Int. Cl.
| | |
|---|---|
| *H04B 7/0456* | (2017.01) |
| *H04B 7/10* | (2017.01) |
| *H04L 5/00* | (2006.01) |
| H04B 17/24 | (2015.01) |
| H04B 7/0404 | (2017.01) |
| H04W 72/12 | (2009.01) |
| H04B 7/0413 | (2017.01) |
| H04W 88/02 | (2009.01) |
| H04W 88/08 | (2009.01) |
| H04B 17/309 | (2015.01) |
| H04B 17/318 | (2015.01) |
| H04B 17/345 | (2015.01) |

(52) U.S. Cl.
CPC ............ *H04B 7/0639* (2013.01); *H04B 7/10* (2013.01); *H04L 5/0048* (2013.01); H04B 7/0404 (2013.01); H04B 7/0413 (2013.01); H04B 17/24 (2015.01); H04B 17/309 (2015.01); H04B 17/318 (2015.01); H04B 17/345 (2015.01); H04W 72/1226 (2013.01); H04W 88/02 (2013.01); H04W 88/08 (2013.01)

(56) References Cited

U.S. PATENT DOCUMENTS

| | | | |
|---|---|---|---|
| 2012/0076024 A1 | 3/2012 | Ko et al. | |
| 2012/0093100 A1 | 4/2012 | Qin et al. | |
| 2013/0010880 A1 | 1/2013 | Koivisto et al. | |
| 2013/0308715 A1 | 11/2013 | Nam et al. | |
| 2013/0321207 A1* | 12/2013 | Monogioudis | H01Q 1/246 342/373 |
| 2014/0086285 A1* | 3/2014 | Yang | H04B 7/0691 375/219 |
| 2014/0098689 A1 | 4/2014 | Lee et al. | |
| 2014/0192762 A1 | 7/2014 | Li et al. | |
| 2014/0192918 A1* | 7/2014 | Park | H04B 7/0486 375/267 |
| 2014/0241190 A1* | 8/2014 | Park | H04B 7/0639 370/252 |
| 2014/0328422 A1* | 11/2014 | Chen | H04B 7/0486 375/267 |
| 2014/0362941 A1 | 12/2014 | Gomadam et al. | |
| 2015/0043673 A1* | 2/2015 | Lee | H04B 7/0469 375/267 |
| 2015/0110210 A1 | 4/2015 | Yang et al. | |
| 2015/0318909 A1 | 11/2015 | Zhang et al. | |
| 2015/0333885 A1 | 11/2015 | Athley | |
| 2015/0372732 A1 | 12/2015 | Kim et al. | |
| 2016/0050003 A1 | 2/2016 | Ko et al. | |
| 2016/0065276 A1 | 3/2016 | Zhang et al. | |
| 2016/0065291 A1 | 3/2016 | Jitsukawa | |
| 2016/0157218 A1* | 6/2016 | Nam | H04B 7/0456 370/329 |
| 2016/0337864 A1 | 11/2016 | Song et al. | |
| 2016/0352401 A1 | 12/2016 | Yu et al. | |
| 2017/0288758 A1 | 10/2017 | Kakishima et al. | |
| 2018/0069609 A1 | 3/2018 | Wang et al. | |
| 2018/0123670 A1 | 5/2018 | Frenne et al. | |
| 2018/0248606 A1 | 8/2018 | Choi et al. | |

OTHER PUBLICATIONS

ETRI, "Potential CSI-RS and CSI feedback enhancements for EBF/FD-MIMO", 3GPP TSG RAN WG1 Meeting #79, R1-144923, Nov. 2014, 6 pages.

U.S. Appl. No. 15/541,684, Notice of Allowance dated Oct. 3, 2018, 14 pages.

U.S. Appl. No. 15/541,684, Office Action dated May 3, 2018, 8 pages.

\* cited by examiner

FIG. 2
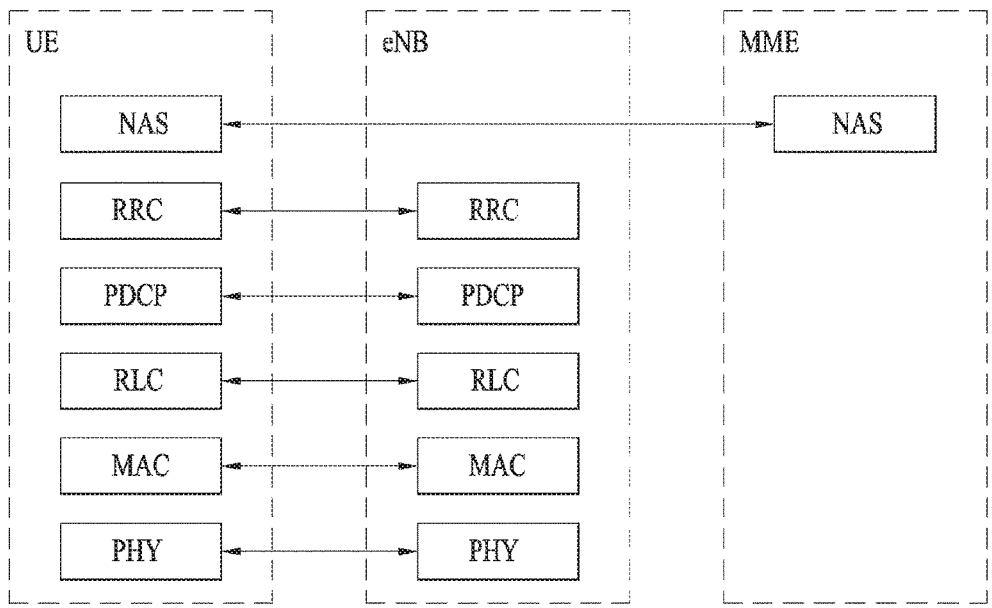
(A) CONTROL-PLANE PROTOCOL STACK
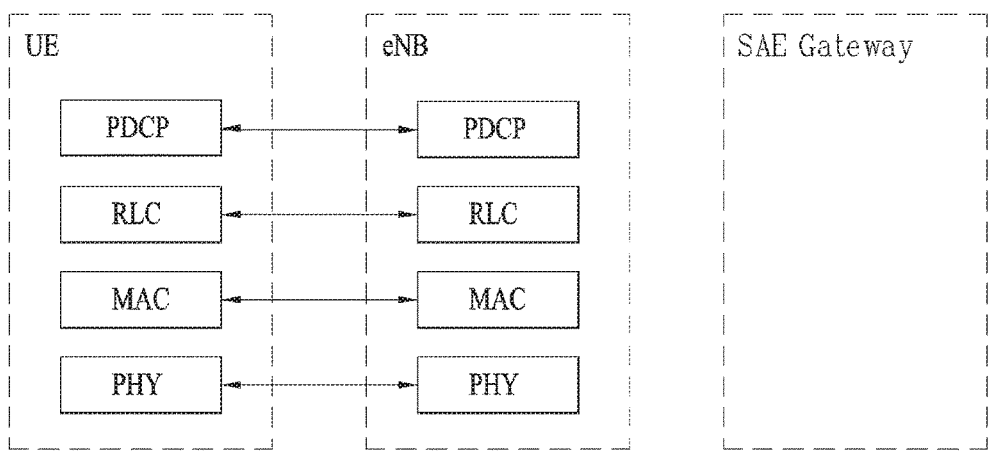
(B) USER-PLANE PROTOCOL STACK

☒ : DMRS GROUP 1

☒ : DMRS GROUP 2

(a) CONVENTIONAL ANTENNA SYSTEM    (b) AAS

METHOD FOR CONFIGURING CHANNEL STATE INFORMATION USING POLARIZATION CHARACTERISTICS OF ANTENNA IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/006357, filed on Jun. 23, 2015, which claims the benefit of U.S. Provisional Application No. 62/099,595, filed on Jan. 5, 2015, the contents of which are all hereby incorporated by reference herein in their entirety.

TECHNICAL FIELD

The present invention relates to a wireless communication system, and more particularly, to a method for configuring channel state information using polarization characteristics of an antenna in a wireless communication system and device therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

Based on the above-described discussion, a method for configuring channel state information using polarization characteristics of an antenna in a wireless communication system and device therefor will be explained.

Technical Solutions

In an aspect of the present invention, provided herein is a method for reporting channel state information to a base station (BS) by a user equipment (UE) in a wireless communication system, including: receiving a first reference signal corresponding to a row of a transmit (Tx) antenna array and a second reference signal corresponding to a column of the Tx antenna array from the BS; receiving a cross-polarization characteristics measurement indicator from the BS; and reporting, to the BS, the channel state information including a first precoder corresponding to the first reference signal and a second precoder corresponding to the second reference signal. In this case, the channel state information may include cross-polarization characteristics information between antenna ports with the same index among antenna ports through which the first and second reference signals are transmitted.

In another aspect of the present invention, provided herein is a method for receiving channel state information from a user equipment (UE) by a base station (BS) in a wireless communication system, including: transmitting a first reference signal corresponding to a row of a transmit (Tx) antenna array and a second reference signal corresponding to a column of the Tx antenna array to the UE; transmitting a cross-polarization characteristics measurement indicator to the UE; and receiving, from the UE, the channel state information including a first precoder corresponding to the first reference signal and a second precoder corresponding to the second reference signal. In this case, the channel state information may include cross-polarization characteristics information between antenna ports with the same index among antenna ports through which the first and second reference signals are transmitted.

In the aspects of the present invention, the first and second reference signals may be transmitted from the BS through antenna ports with different polarizations. In this case, each of the first and second reference signals may be transmitted through antenna ports with the same polarization.

Preferably, the cross-polarization characteristics information may include information on phase differences between the antenna ports with the same index. Alternatively, the cross-polarization characteristics information may include a third precoder corresponding to the number of the antenna ports with the same index.

Advantageous Effects

According to embodiments of the present invention, channel state information can be efficiently configured using polarization characteristics of an antenna in a wireless communication.

It will be appreciated by persons skilled in the art that the effects that can be achieved with the present disclosure are not limited to what has been particularly described hereinabove and other advantages of the present disclosure will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE FOR INVENTION

Figure 1:
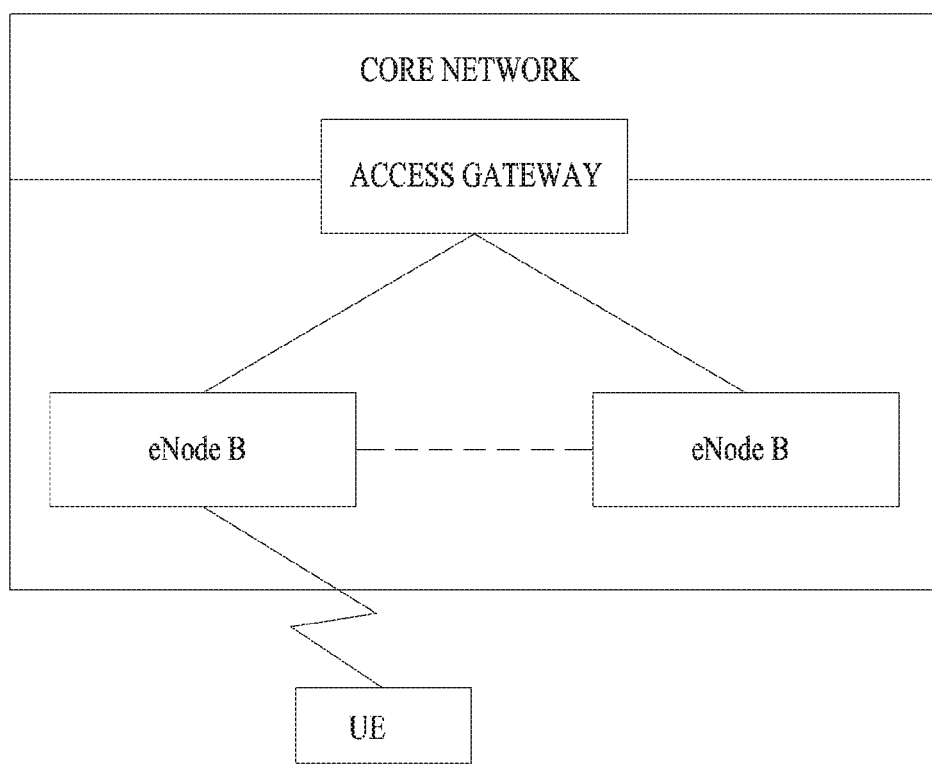
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
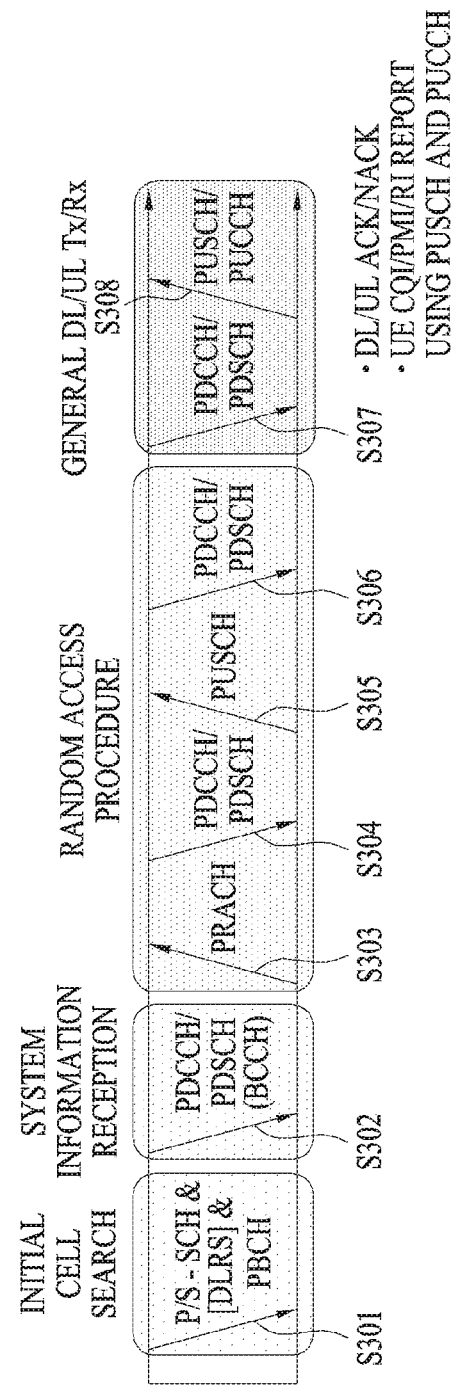
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
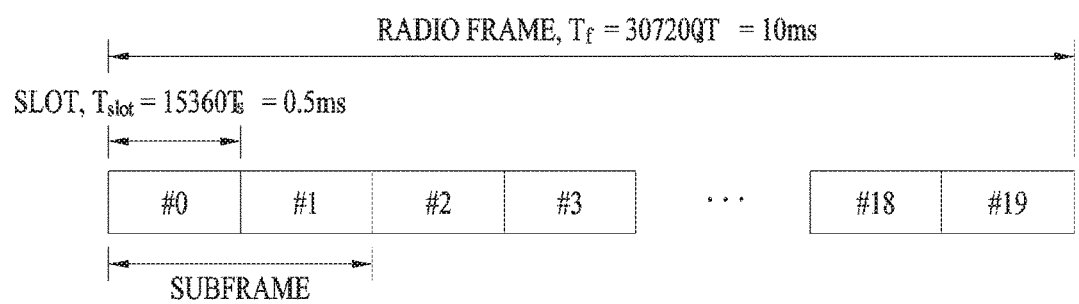
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10−8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
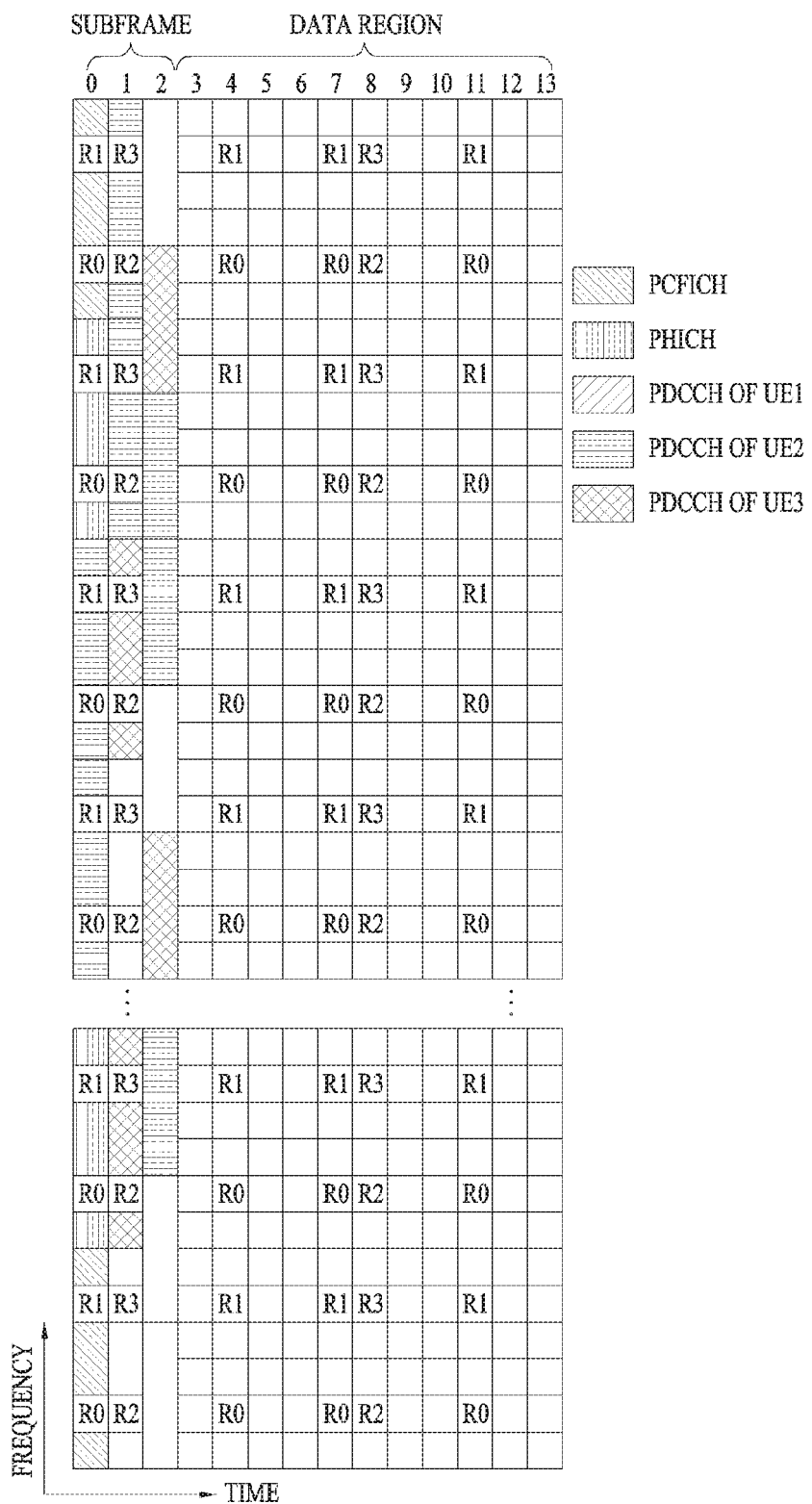
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
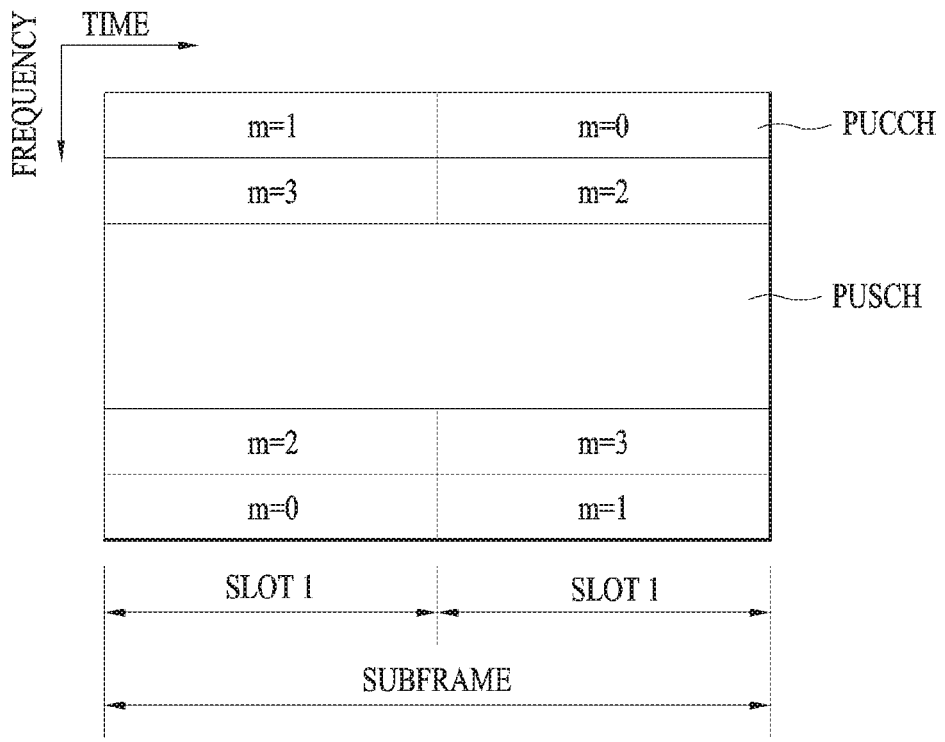
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
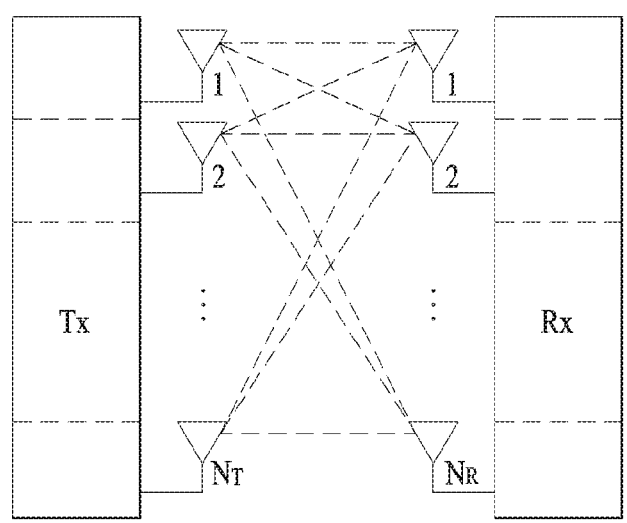
FIG. 7 illustrates a configuration of a general Multiple Input Multiple Output (MIMO) communication system.

FIG. 7 illustrates the configuration of a typical MIMO communication system.

Referring to FIG. 7, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$

[Equation 5]

$$W\hat{s} = WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by [Equation 7].

$$\text{\# of streams} \leq \text{rank}(H) \leq \min(N_T, N_R) \qquad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description will be given of channel state information (CSI) reporting. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \qquad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \qquad \text{[Equation 9]}$$

where $X_i$ is Nt/2 by M matrix.

$$W2(j) = \overbrace{\begin{bmatrix} e_M^k & e_M^l & e_M^m \\ & \cdots & \\ \alpha_j e_M^k & \beta_j e_M^l & \gamma_j e_M^m \end{bmatrix}}^{r\ columns}$$

(if rank=r), where $1 \leq k, l, m \leq M$ and k, l, m are integer.

In [Equation 9], the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as [Equation 10].

$$W1(i) * W2(j) = \begin{bmatrix} X_i(k) \\ \alpha_j X_i(k) \end{bmatrix}$$ [Equations 10]

In [Equation 10], a codeword is expressed as an $N_T \times 1$ vector where NT is the number of Tx antennas and the codeword is composed of an upper vector $X_i(k)$ and a lower vector $\alpha_j X_i(k)$ representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback.

The CSI feedback is transmitted on a PUCCH or a PUSCH to an eNB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
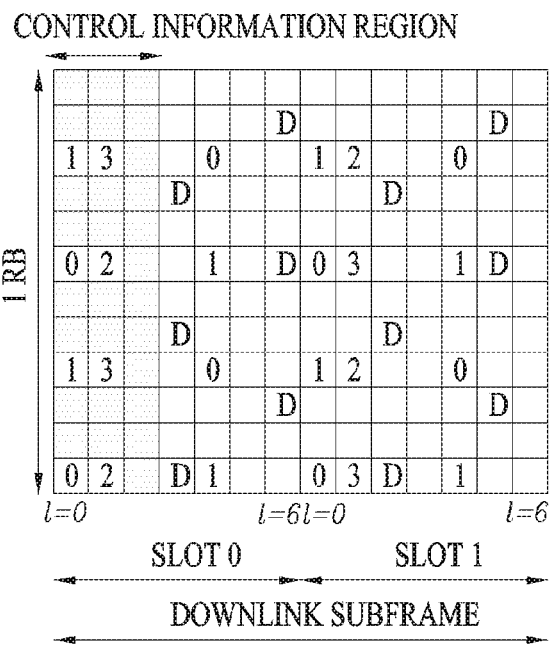
FIGS. 8 and 9 illustrate downlink Reference Signal (RS) configurations in an LTE system supporting downlink transmission through four antennas.
Figure 9:
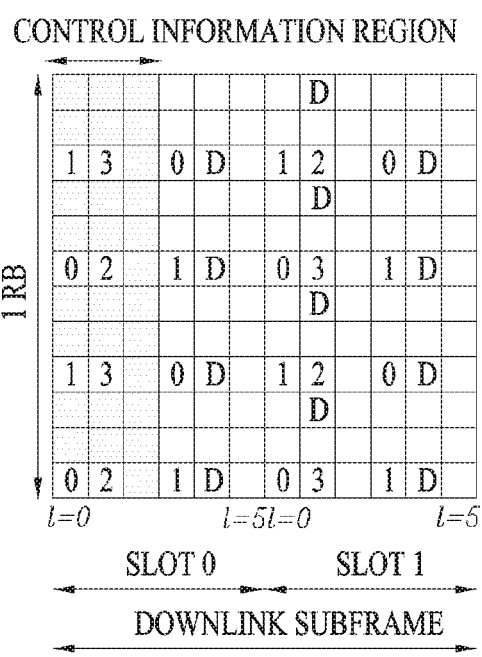

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSS transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DM-RSs). The DM-RSs are transmitted in a data region, that is, on a PDSCH, supporting single-antenna port transmission. The existence or absence of a UE-specific RS, DM-RS is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
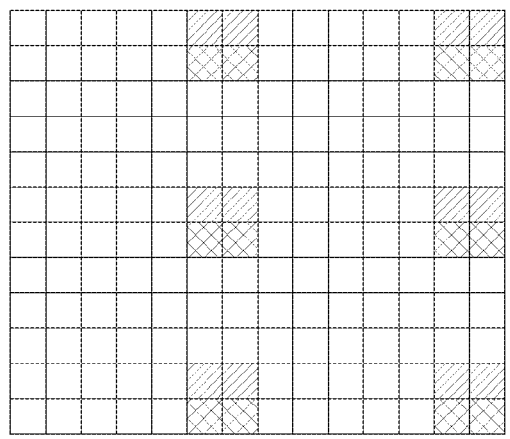
FIG. 10 illustrates an exemplary downlink Demodulation Reference Signal (DM-RS) allocation defined in a current 3GPP standard specification.

FIG. 10 illustrates an exemplary DL DM-RS allocation defined in a current 3GPP standard specification.

Referring to FIG. 10, DM-RSs for antenna ports 7, 8, 11, and 13 are mapped using sequences for the respective antenna ports in a first DM-RS group (DM-RS Group 1), whereas DM-RSs for antenna ports 9, 10, 12, and 14 are mapped using sequences for the respective antenna ports in a second DM-RS group (DM-RS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame struc- ture type 1 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| and 2   4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame   20 | (11, 1) | 1 | (11, 1) | 1 | (11, 1) | 1 |
| structure 21 | (9, 1) | 1 | (9, 1) | 1 | (9, 1) | 1 |
| type 2   22 | (7, 1) | 1 | (7, 1) | 1 | (7, 1) | 1 |
| only    23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame      0 | (11, 4) | 0 | (11, 4) | 0 | (11, 4) | 0 |
| structure  1 | (9, 4) | 0 | (9, 4) | 0 | (9, 4) | 0 |
| type 1     2 | (10, 4) | 1 | (10, 4) | 1 | (10, 4) | 1 |
| and 2      3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame     16 | (11, 1) | 1 | (11, 1) | 1 | (11, 1) | 1 |
| structure 17 | (10, 1) | 1 | (10, 1) | 1 | (10, 1) | 1 |
| type 2    18 | (9, 1) | 1 | (9, 1) | 1 | (9, 1) | 1 |
| only      19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Figure 11:
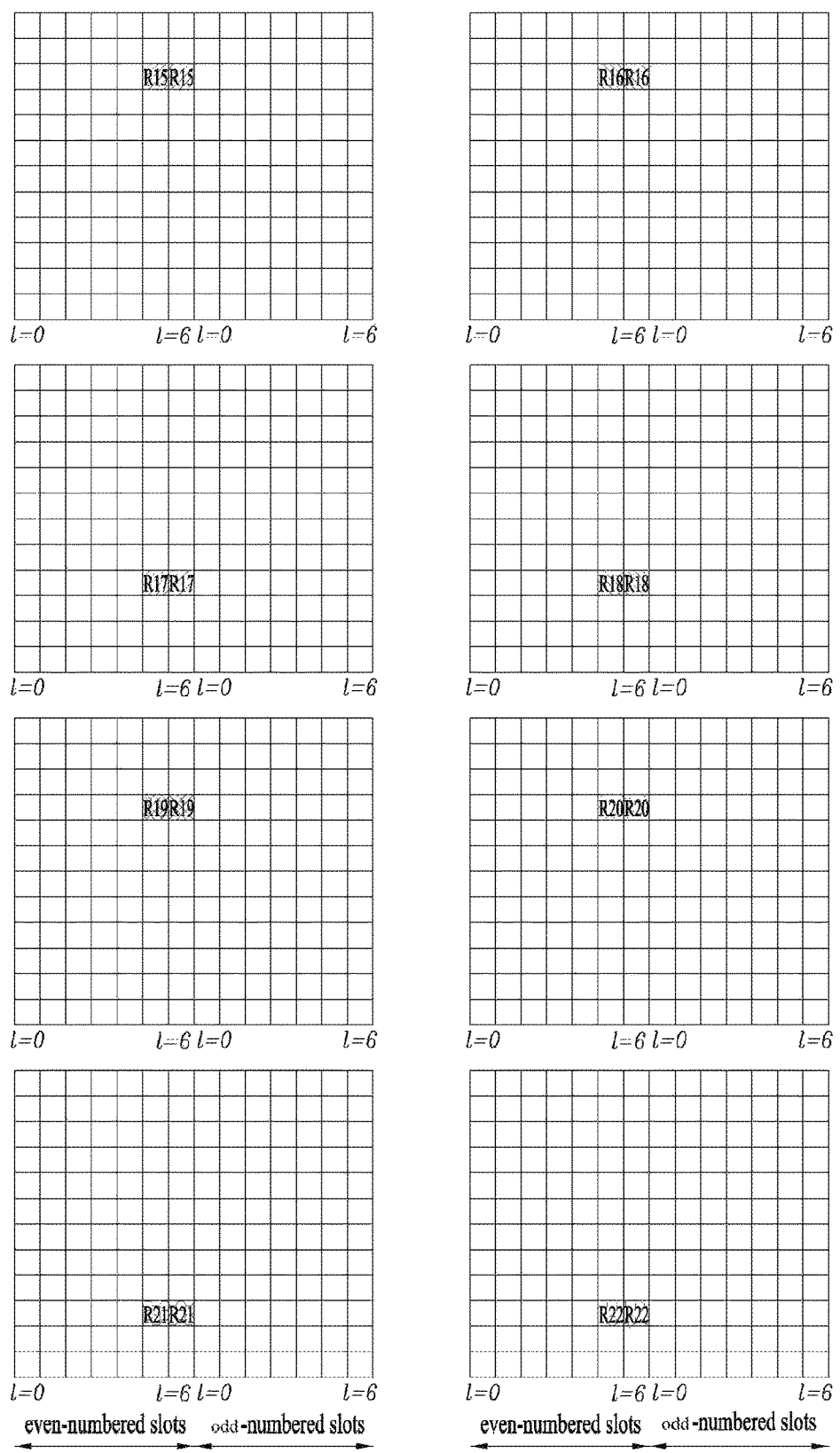
FIG. 11 illustrates Channel State Information-Reference Signal (CSI-RS) configuration #0 of downlink CSI-RS configurations defined in a current 3GPP standard specification.

In [Table 1] and [Table 2], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS-Config-r10 ::=      SEQUENCE {
    csi-RS-r10              CHOICE {
    ...
    }
    zeroTxPowerCSI-RS-r10   CHOICE {
        release                 NULL,
        setup                   SEQUENCE {
            zeroTxPowerResourceConfigList-r10   BIT STRING
(SIZE (16)),
            zeroTxPowerSubframeConfig-r10       INTEGER
(0..154)
        }
    }
}
-- ASN1STOP
```

The current 3GPP standard defines modulation orders and cording rates for respective CQI indexes as illustrated in [Table 5].

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
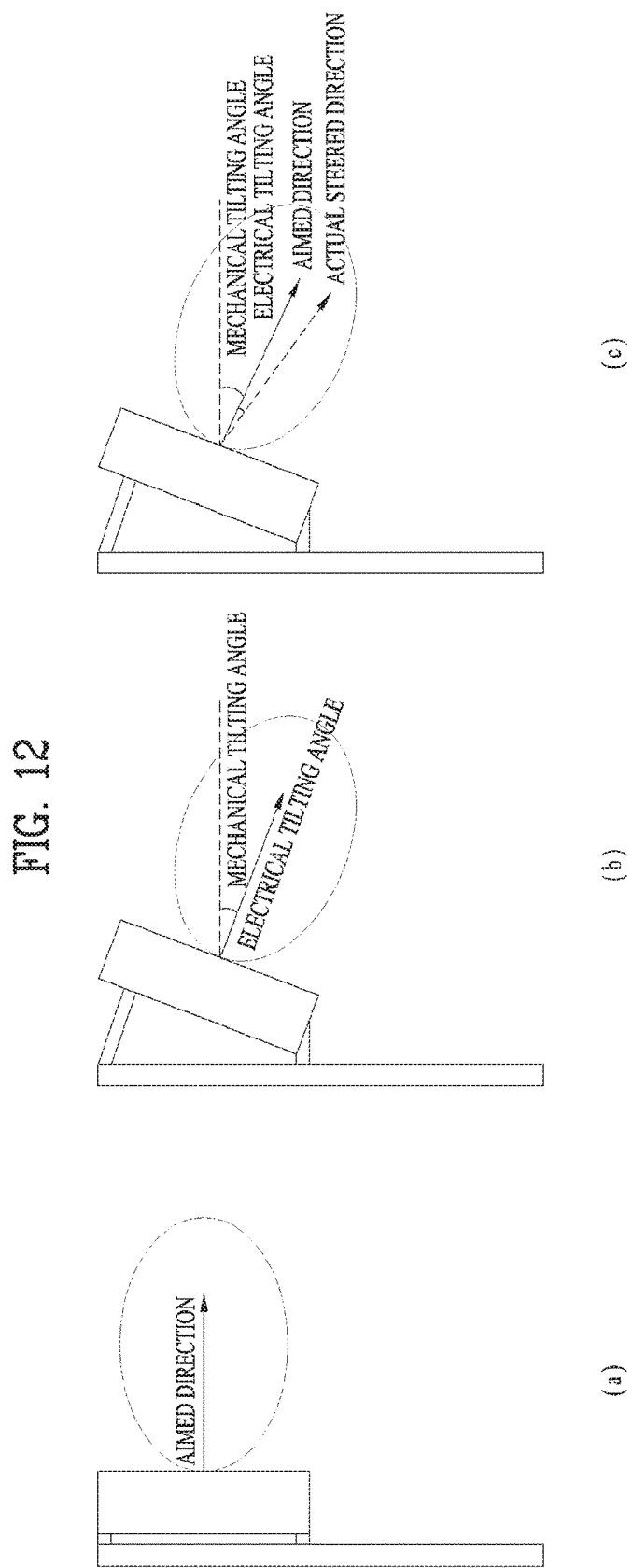
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical tilting are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
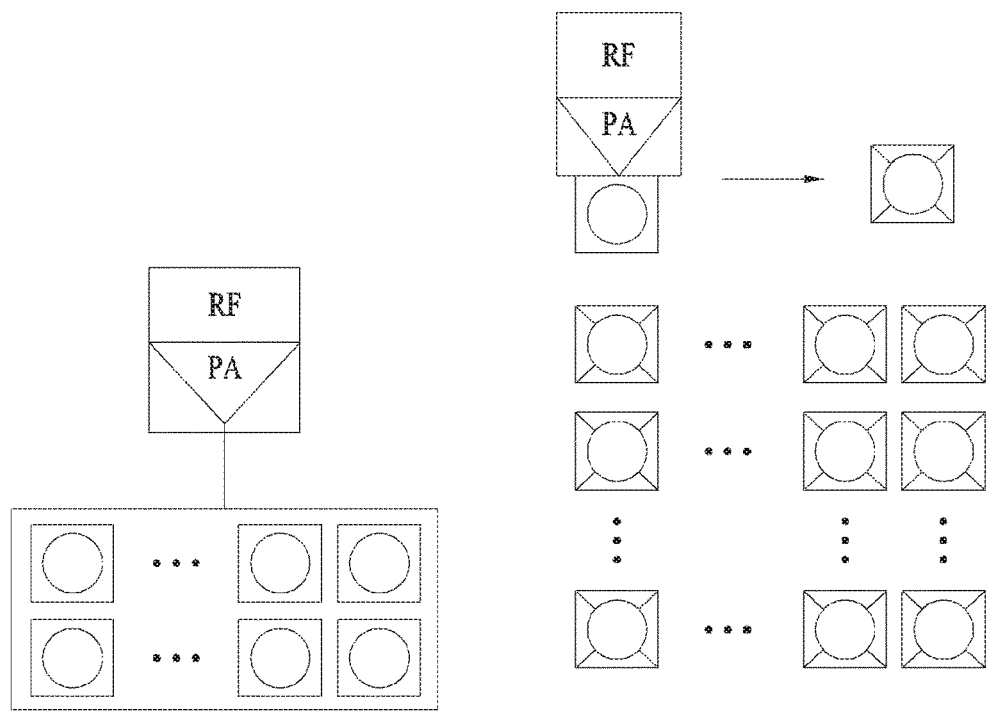
FIG. 13 is a view comparing an antenna system of the related art with an Active Antenna System (AAS).

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming. 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
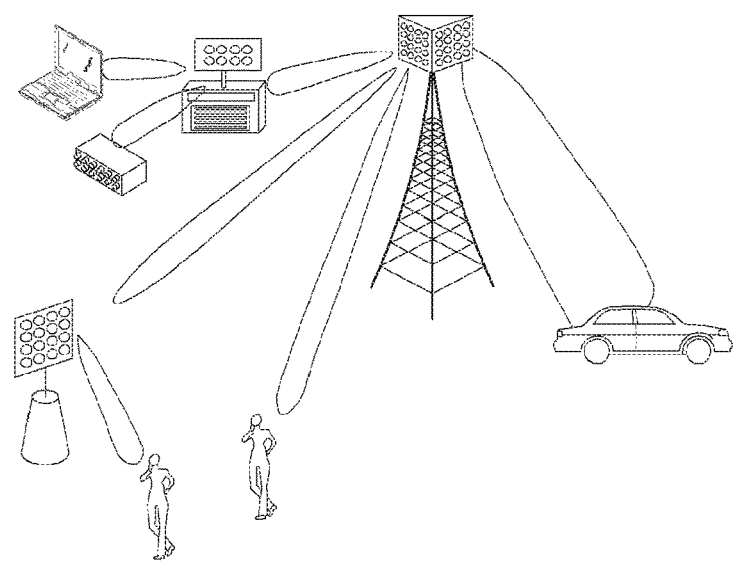
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
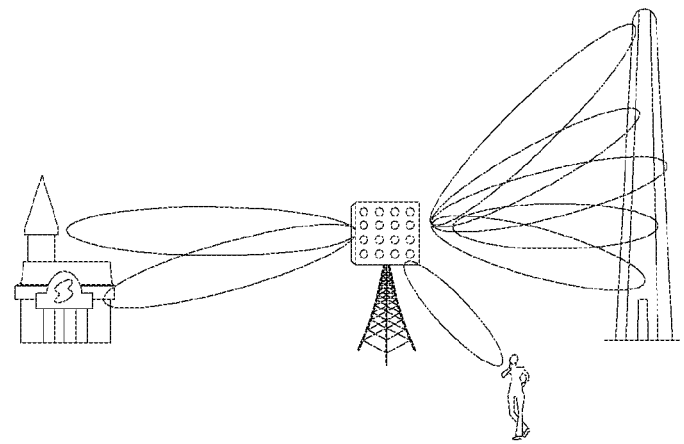
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

Now a description will be given of a MIMO system using linear precoding. A DL MIMO system may be modeled as [Equation 11] in frequency units (e.g. a subcarriers) that are assumed to experience flat fading in the frequency domain in a narrow band system or a wideband system.

$$y = Hx + z \quad \text{[Equation 11]}$$

If the number of Rx antenna ports at a UE is $N_r$ and the number of Tx antenna ports at an eNB is $N_t$, y is an $N_r \times 1$ signal vector received at the $N_r$ Rx antennas of the UE, H is a MIMO channel matrix of size $N_r \times N_t$, x is $N_t \times 1$ transmission signals, and z is an $N_r \times 1$ received noise and interference vector in [Equation 11].

The above system model is applicable to a multi-user MIMO scenario as well as a single-user MIMO scenario. While $N_r$ is the number of Rx antennas at the single UE in the single-user MIMO scenario, $N_r$ may be interpreted as the total number of Rx antennas at multiple UEs in the multi-user MIMO scenario.

The above system model is applicable to a UL transmission scenario as well as a DL transmission scenario. Then, $N_t$ may represent the number of Tx antennas at the UE and $N_r$ may represent the number of Rx antennas at the eNB.

In the case of a linear MIMO precoder, the MIMO precoder may be generally represented as a matrix U of size $N_t \times N_s$ where $N_s$ is a transmission rank or the number of transmission layers. Accordingly, the transmission signal vector x may be modeled as [Equation 12].

$$x = \sqrt{\frac{P_T}{N_s}} Us \quad \text{[Equation 12]}$$

In [Equation 12], $P_T$ is transmission signal energy and s is an $N_s \times 1$ transmission signal vector representing signals transmitted in $N_s$ transmission layers. That is, $E\{s^H U^H U s\}$. Let $N_t \times 1$ precoding vectors corresponding to the $N_s$ transmission layers be denoted by $u_1, \ldots, u_{N_s}$. Then, $U = [u_1 \ldots u_{N_s}]$. In this case, [Equation 12] may be expressed as [Equation 13].

$$x = \sqrt{\frac{P_T}{N_s}} \sum_{i=1}^{N_s} u_i s_i \quad \text{[Equation 13]}$$

In [Equation 13], $s_i$ is an ith element of the vector s. Generally, it may be assumed that signals transmitted in different layers are uncorrelated ($E\{s_j^* s_i\} = 0 \forall i \neq j$) and the average magnitude of each signal is the same. If it is assumed that the average energy of each signal is 1 ($E\{|s_i|^2\} = 1 \forall i$) for the convenience of description, the sum of the energy of the layer precoding vectors is $N_s$ given as [Equation 14].

$$\sum_{i=1}^{N_s} E\{u_i^H u_i\} = N_s \quad \text{[Equation 14]}$$

If a signal is to be transmitted with the same power in each layer, it is noted from [Equation 14] that $E\{u_i^H u_i\} = 1$.

As a future multi-antenna system such as massive MIMO or large-scale MIMO evolves, the number of antennas will increase gradually. In fact, use of up to 64 Tx antennas is considered for an eNB in the LTE standard, taking into account a 3D MIMO environment.

However, as the number of antennas increases, pilot overhead and feedback overhead also increase. As a result, decoding complexity may be increased. Since the size of the MIMO channel matrix H increases with the number of antennas at an eNB, the eNB should transmit more measurement pilots to a UE so that the UE may estimate the MIMO channels. If the UE feeds back explicit or implicit information about the measured MIMO channels to the eNB, the amount of feedback information will increase as the channel matrix gets larger. Particularly when a codebook-based PMI feedback is transmitted as in the LTE system, the increase of antennas in number leads to an exponential increase in the size of a PMI codebook. Consequently, the computation complexity of the eNB and the UE is increased.

In this environment, system complexity and overhead may be mitigated by partitioning total Tx antennas and thus transmitting a pilot signal or a feedback on a sub-array basis. Especially from the perspective of the LTE standard, a large-scale MIMO system may be supported by reusing most of the conventional pilot signal, MIMO precoding scheme, and/or feedback scheme that support up to 8 Tx antennas.

From this viewpoint, if each layer precoding vector of the above MIMO system model is partitioned into M sub-precoding vectors and the sub-precoding vectors of a precoding vector for an ith layer are denoted by $u_{i,1}, \ldots, u_{i,M}$, the precoding vector for the ith layer may be represented as $u_i[u_{i,1}^T u_{i,2}^T \ldots u_{i,M}^T]^T$.

Each sub-precoding vector experiences, as effective channels, a sub-channel matrix including Tx antennas in a partition corresponding to the sub-precoding vector, obtained by dividing the $N_r \times N_t$ MIMO channel matrix H by rows. The MIMO channel matrix H is expressed using the sub-channel matrices, as follows.

$$H = [H_1 \ldots H_M] \quad \text{[Equation 15]}$$

If the UE determines each preferred sub-precoding vector based on a PMI codebook, an operation for normalizing each sub-precoding vector is needed. Normalization refers to an overall operation for processing the value, size, and/or phase of a precoding vector or a specific element of the precoding vector in such a manner that sub-precoding vectors of the same size may be selected from a PMI codebook for the same number of Tx antennas.

For example, if the first element of the PMI codebook is 0 or 1, the phase and size of each sub-precoding vector may be normalized with respect to 0 or 1. Hereinbelow, it is assumed that a sub-precoding vector $u_{i,m}$ for an mth partition is normalized with respect to a value of $\alpha_{i,m}$ and the normalized sub-precoding vector or the Normalized Partitioned Precoder (NPP) is $v_{i,m} = u_{i,m} / \alpha_{i,m}$. Therefore, partitioned precoding is modeled as [Equation 16], in consideration of codebook-based precoding.

$$u_i[\alpha_{i,1} v_{i,1}^T, \alpha_{i,2} v_{i,2}^T \ldots \alpha_{i,M} v_{i,M}^T]^T \quad \text{[Equation 16]}$$

As noted from [Equation 16], the values of $\alpha_{i,m}$ may be interpreted as values that link the NPPs to each other from the perspective of the whole precoder. Hereinafter, these values will be referred to as linking coefficients. Thus, a precoding method for the total Tx antennas (antenna ports)

may be defined by defining NPPs for the partitions of antenna ports and linking coefficients that link the NPPs to one another.

M linking coefficients for the ith layer may be defined as a vector $a_i=[\alpha_{i,1}\ \alpha_{i,2}\ \ldots\ \alpha_{i,M}]^T$. Herein, $a_i$ will be referred to as a 'linking vector'.

While it may be said that the linking vector is composed of M values, the other (M−1) values $b_i$ normalized with respect to the first element of the linking vector may be regarded as the linking vector. That is, the relative differences of the other (M−1) NPPs with respect to the first NPP may be defined as a linking vector as expressed in [Equation 17]. This is because it is assumed in many cases that the first element is already normalized from the perspective of the whole precoding vector $u_i$.

$$\frac{a_i}{\alpha_{i,1}} = \left[1\ \frac{\alpha_{i,2}}{\alpha_{i,1}}\ \frac{\alpha_{i,3}}{\alpha_{i,1}}\ \ldots\ \frac{\alpha_{i,M}}{\alpha_{i,1}}\right]^T = [1\ b_i^T]^T \qquad \text{[Equation 17]}$$

If each of the transmission layers is divided into the same number of partitions, a linking matrix expressed as [Equation 18] may also be defined. An NPP for each partition in the form of a matrix may be defined as [Equation 19].

$$A=[a_1\ \ldots\ a_{N_s}] \qquad \text{[Equation 18]}$$

$$V_m=[v_{1,m}\ \ldots\ v_{N_s,m}], m=1,\ldots,M \qquad \text{[Equation 19]}$$

Let a vector obtained by repeating each element of an M×1 linking vector as many times as the size of each partition be denoted by an extended linking vector $\hat{a}_i$. For example, if M=2 and the sizes of the first and second partitions are 3 and 4, respectively for an ith layer, $\hat{a}_i=[\alpha_{i,1}\ \alpha_{i,1}\ \alpha_{i,1}\ \alpha_{i,2}\ \alpha_{i,2}\ \alpha_{i,2}\ \alpha_{i,2}]^T$. An extended linking matrix $\hat{A}=[\hat{a}_1\ \ldots\ \hat{a}N_s]$ may be defined by stacking the extended linking vectors.

In this case, the whole precoding matrix may be expressed as a Hadamard product (or element-wise product) between the extended linking matrix and the NPP matrix $V_t$ in [Equation 20].

$$U=\hat{A}\circ V_t \qquad \text{[Equation 20]}$$

In [Equation 20], $V_t=[V_1^T\ \ldots\ V_M^T]^T$ and the matrix operator $\circ$ represents the Hadamard product.

The (extended) linking vectors and the (extended) linking matrix are collectively called a linking precoder. The term precoder is used herein because the (extended) linking vectors and the (extended) linking matrix are elements determining the Tx antenna precoder. As noted from [Equation 20], one linking precoder may be configured, which should not be construed as limiting the present invention. For example, a plurality of sub-linking vectors may be configured by additional partitioning of the linking vector $a_i$ and sub-linking precoders may be defined accordingly. While the following description is given in the context of a single linking precoder, a linking precoder partitioning scenario is not excluded.

While the linking coefficients are represented in such a manner that different linking coefficients are applicable to different transmission layers in the same partition, if each layer is partitioned in the same manner, the linking coefficients may be configured independently of the transmission layers. That is, the same linking coefficients may be configured for every layer. In this case, the relationship between the linking vectors $a \triangleq a_1 = \ldots = a_{N_s}$ is established between the linking vectors. Then the linking precoder may be expressed only with M or (M−1) linking coefficients.

MIMO precoding schemes may be categorized largely into closed-loop precoding and open-loop precoding. When a MIMO precoder is configured, channels between a transmitter and a receiver are considered in the closed-loop precoding scheme. Therefore, additional overhead such as transmission of a feedback signal from a UE or transmission of a pilot signal is required so that the transmitter may estimate MIMO channels. If the channels are accurately estimated, the closed-loop precoding scheme outperforms the open-loop precoding scheme. Thus, the closed-loop precoding scheme is used mainly in a static environment experiencing little channel change between a transmitter and a receiver (e.g. an environment with a low Doppler spread and a low delay spread) because the closed-loop precoding scheme requires channel estimation accuracy. On the other hand, the open-loop precoding scheme outperforms the closed-loop precoding scheme in an environment experiencing a great channel change between a transmitter and a receiver because there is no correlation between the channel change between the transmitter and the receiver and a MIMO precoding scheme.

To apply closed-loop precoding to a massive MIMO environment having a large number of antennas, information about each sub-precoder and information about a linking precoder are required. Without codebook-based feedback, the linking precoder information may not be needed. Depending on a partitioning method, effective channels experienced by each sub-precoder may have different characteristics from effective channels experienced by the linking precoder.

For example, one sub-precoder may experience MIMO channels having a relatively low Doppler spread, whereas another sub-precoder may experience MIMO channels having a relatively high Doppler spread. In another example, while all sub-precoders may experience effective channels having similar Doppler characteristics, the linking precoder may experience effective channels having different Doppler characteristics. Hereinafter, a fractional beamforming scheme for adaptively optimizing a MIMO transmission scheme according to partitioned channels and linking channels in the partitioned precoding environment will be described.

<Fractional Beamforming>

An eNB may perform closed-loop precoding with respect to some of precoders for antenna port partitions and linking precoders for linking antenna port partitions and apply one of the following precoding schemes to the other precoders.

1. A precoding scheme defined in a system (hereinafter, default precoding)

2. A precoding scheme pre-designated by an eNB or a network (hereinafter, reference precoding)

3. A precoding scheme randomly set by an eNB (hereinafter, random precoding)

Hereinafter, a set of partitions and/or linking coefficients, to which closed-loop precoding is applied, is referred to as a control space and a set of partitions and/or linking coefficients, to which closed-loop precoding is not applied, is referred to as a non-control space.

The default precoding scheme which is defined in the system refers to a method of defining and using a beam transmitted to the non-control space in the system. Default precoding may be defined to follow an arbitrary open-loop precoding scheme. Default precoding may be differently configured according to system bandwidth, the number of transmit antennas of an eNB, the number of transmission layers (or transmission rank), transmit antenna configurations $N_{t\_v}$ and $N_{t\_h}$ of an eNB or the number of transmit antennas of a non-control direction. Alternatively, a specific beam may be configured regardless of the system parameters. In addition, default precoding may be fixed over the entire frequency band and time or may be changed in specific time or frequency resource units.

In addition, the reference precoding scheme which is pre-designated by the eNB or the network refers to a method of designating a precoding scheme to be applied to the non-control space with respect to a UE in the eNB or the network. Accordingly, reference precoding information of the non-control space is delivered to the UE via a physical layer or higher layer message. The reference precoding information means all information explicitly or implicitly indicating a MIMO precoder to be applied to the non-control space. For example, a specific index (PMI) of a PMI codebook corresponding to the number of transmit antennas in the non-control space, a quantized value of each element of a MIMO precoding matrix of the non-control space, an index to be used for transmission after indexing a plurality of MIMO precoding schemes may be signaled as reference precoding information.

In addition, reference precoding may change in specific time or frequency resource units. In this case, after a plurality of change patterns is defined according to time/frequency resources of reference precoding, a reference precoding pattern index used in the eNB or the network may be signaled as reference precoding information. Alternatively, the seed value of a random number generator for deriving a change pattern according to time/frequency resources may also be used as reference precoding information. Alternatively, information as to which of various precoding schemes (e.g., STBC, delay diversity, etc.) is used may be used as reference precoding information.

Further, a random precoding scheme which is randomly set by the eNB means a method of arbitrarily determining and applying a precoding scheme to be applied to the non-control space at the eNB. Accordingly, unlike the default precoding scheme or the reference precoding scheme, the UE does not know the precoder to be applied to the non-control space. For example, the eNB may transmit a beam randomly changed in specific time resource units (e.g., OFDM symbols) and/or frequency resource units (e.g., subcarriers) to the non-control space.

In the above-described fractional beamforming schemes, independent partitioning and fractional beamforming schemes are applicable according to transmission layers. Alternatively, the same partitioning and fractional beamforming scheme is applicable to all transmission layers.

The above-described fractional beamforming scheme is suitable for a channel environment in which reliability of feedback information of some transmit antennas or feedback information of linking coefficients decreases or feedback is unnecessary. In particular, when reliability of feedback information of some of transmit antennas or feedback information of linking coefficients decreases, unnecessary packet reception errors and retransmission due to feedback information errors may be prevented and, when feedback is unnecessary, feedback overhead may be minimized.

<Aligned Partitioned Precoding>

If some or all antenna port partitions have the same size and partitioned antenna arrays have similar efficient channel properties, the same precoding scheme, that is, aligned partitioned precoding, is applicable to the NPPs.

Figure 16:
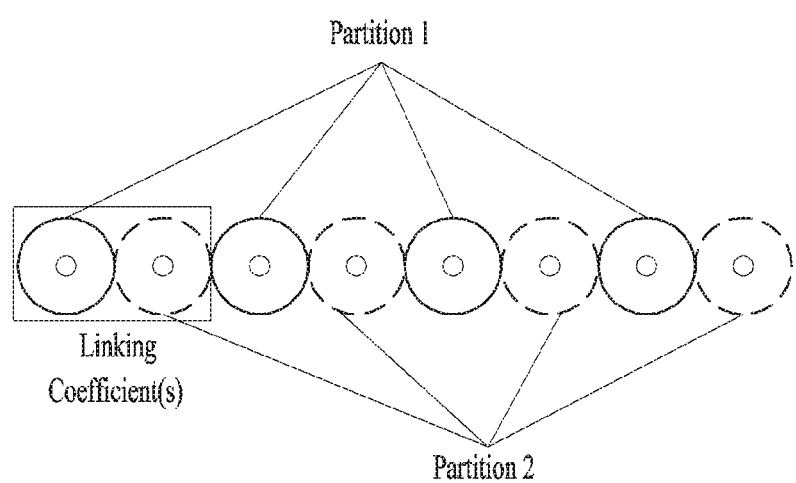
FIG. 16 illustrates an example of applying aligned fractional precoding to a Uniform Linear Array (ULA).

FIG. 16 illustrates an example of applying aligned partitioned precoding in a uniform linear array.

Referring to FIG. 16, in the uniform linear array (ULA) composed of eight antennas, a first partition is composed of first, third, fifth and seventh antennas and a second partition is composed of second, fourth, sixth and eighth antennas. If a gap between antennas is narrow and few scatterers are present, the first partition and the second partition are likely to experience similar MIMO channels except for a phase difference between the two partitions corresponding to a linking precoder component. In this case, the same precoding scheme is configured to be applied to the two partitions.

Figure 17:
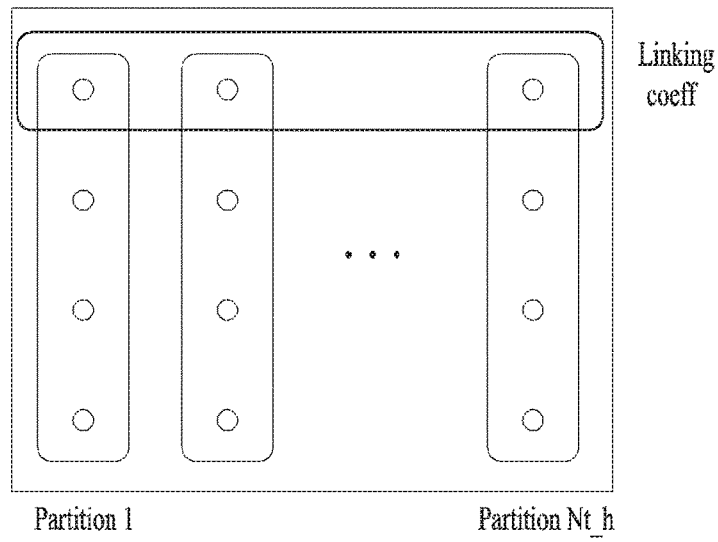
FIG. 17 illustrates an example of applying columnwise aligned fractional precoding to a square array.

FIG. 17 illustrates an example of applying column based aligned partitioned precoding in a square array.

Referring to FIG. 17, in a square array composed of $N_t(N_{t\_v} \times N_{t\_h})$ antennas including $N_{t\_v}$ rows and $N_{t\_h}$ columns, each column is configured as one partition. In an environment in which a distance between columns is close and $N_{t\_h}$ is not large, the same precoding scheme may be configured to be applied to all partitions. A linking vector is configured independently of a sub-precoder.

Figure 18:
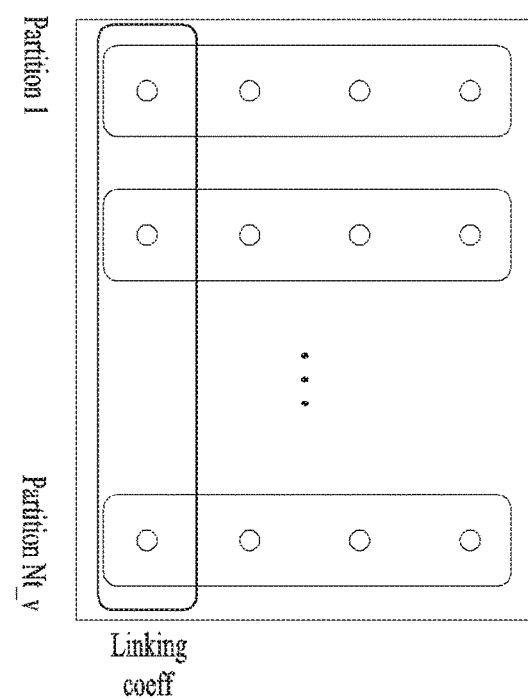
FIG. 18 illustrates an example of applying rowwise aligned fractional precoding to a square array.

FIG. 18 illustrates an example of applying row based aligned partitioned precoding in a square array.

Referring to FIG. 18, in a square array composed of $N_t(N_{t\_v} \times N_{t\_h})$ antennas including $N_{t\_v}$ rows and $N_{t\_h}$ columns, each row is configured as one partition. In an environment in which a distance between rows is close and $N_{t\_v}$ is not large, the same precoding scheme may be configured to be applied to all partitions. A linking vector is set independently of a sub-precoder.

Figure 19:
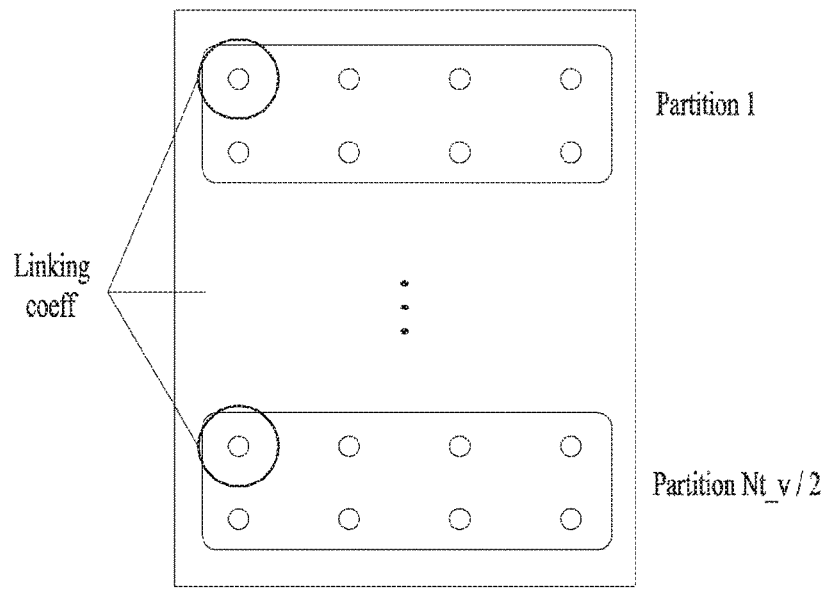
FIG. 19 illustrates an example of applying row groupwise aligned fractional precoding to a square array.

FIG. 19 illustrates an example of applying row group based aligned partitioned precoding in a square array.

Referring to FIG. 19, in a square array composed of $N_t(N_{t\_v} \times N_{t\_h})$ antennas including $V_{t\_v}$ rows and $N_{t\_h}$ columns, a row group composed of N rows is configured as one partition. In an environment in which a distance between rows is close and $N_{t\_v}$ is not large, the same precoding scheme may be configured to be applied to all partitions. A linking vector is configured independently of a sub-precoder.

As in the examples of FIGS. 16 to 19, if the sizes of all partitions are the same and the same precoder is applied to all partitions (that is, $v_{i,1} \triangleq v_{i,1} = \ldots = v_{i,M}$), the precoder of an i-th layer may be expressed by a Kronecker product of a linking precoder and a sub-precoder as shown in the following equation.

$$u_i = [\alpha_{i,1} v_{i,1}^T \alpha_{i,2} v_{i,2}^T \ldots \alpha_{i,M} v_{i,M}^T]^T = [\alpha_{i,1} v_i^T \alpha_{i,2} v_i^T \ldots \alpha_{i,M} v_i^T]^T = a_i \otimes v_i \quad \text{[Equation 21]}$$

In addition, if the same partitioning is performed with respect to all transmission layers, the MIMO precoder of all the layers may be expressed by a Khatri-Rao product (column-wise Kronecker product) of a sub-precoding matrix $V = [v_1 \ldots v_{N_s}]$ having a size of $$\frac{N_t}{M} \times N_s$$

and a linking matrix A having a size of $M \times N_s$ as shown in Equation 22 below.

$$U = [a_1 \otimes v_1 \ldots a_{N_s} \otimes v_{N_s}] = A * V \quad \text{[Equation 22]}$$

In addition, as shown in FIG. 17, in a two-dimensional antenna port array environment, when each column is configured as a partition, the sub-precoder $v_i$ or V performs vertical beamforming (or elevation beamforming) and the linking precoder $a_i$ or A performs horizontal beamforming (or azimuth beamforming). Similarly, as shown in FIG. 18, in a two-dimensional antenna port array environment, when each row is configured as a partition, the sub-precoder $v_i$ or V performs horizontal beamforming and the linking precoder $a_i$ or A performs vertical beamforming.

As a result, as in the example of FIG. 17 or 18, in the two-dimensional (2D) antenna (port) array environment, when perfectly aligned partitioned precoding is performed in a row or column direction, the precoder for performing three-dimensional (3D) beamforming may be expressed by one sub-precoder and one linking precoder and one of the two precoders performs vertical beamforming and the other precoder performs horizontal beamforming.

When fractional beamforming proposed in the environment in which the perfectly aligned partitioned precoding is performed is applied, in the environment in which the precoding schemes applied to all partitions are coincident, the eNB performs closed-loop precoding with respect to any one of the sub-precoder and the linking precoder and applies one of default precoding, reference precoding and random precoding to the other precoder.

As shown in FIGS. 17 and 18, 3D beamforming is suitable for the 2D antenna array environment. 3D beamforming and, more particularly, UE-specific 3D beamforming can optimize performance in a fading environment in a 3D space and the vertical/horizontal position of the UE. However, accurate channel information (CSI) between the eNB and the UE is required in order to appropriately perform UE-specific 3D beamforming using the closed-loop precoding scheme.

Accordingly, since a difference between a minimum value and a maximum value of performance according to the MIMO transmission method increases by increase in the number of eNB antennas and the beamforming order, performance sensitivity due to eNB CSI estimation error factors such as channel estimation error, feedback error and channel aging further increases. When CSI estimation error of the eNB is not severe, normal transmission may be performed by channel coding. However, when error is severe, packet reception error may occur and thus packet retransmission may be performed. That is, performance may extremely deteriorate.

For example, when 3D beamforming is performed with respect to a UE which rapidly moves in a horizontal direction of the eNB, packet retransmission is highly likely to be performed. Although an open-loop precoding scheme is conventionally performed with respect to this UE, this UE experiences a static channel in a vertical direction and thus vertical beamforming is advantageously performed. Horizontal beamforming is advantageously performed with respect to a UE which rapidly moves in a vertical direction or a UE in an environment in which scattering is severe in a vertical direction. In addition with respect to a UE located in a high and narrow building, 3D beamforming is performed and a horizontal beamforming direction may be fixed to a specific direction by the eNB. That is, the UE may be prompted to configure feedback information only for vertical beamforming and feedback overhead may be reduced.

Accordingly, when fractional beamforming is applied to a 3D beamforming environment, 2D beamforming (vertical beamforming or horizontal beamforming) may be performed according to user environments. Therefore, this may be referred to as partial dimensional beamforming. For example, an eNB having a 2D transmit antenna port may perform closed-loop precoding with respect to any one of a vertical precoder and a horizontal precoder and apply one of default precoding, reference precoding and random precoding to the other precoder.

In the above-described partitioned precoding scheme, the sub-precoder and the linking precoder are defined from the viewpoint of data transmission of the eNB. From the viewpoint of the UE, in association with the sub-precoder and the linking precoder, to which the closed-loop method is applied, a preferred precoding index (PPI) may be transmitted to the eNB. As a representative PPI, there is a PMI feedback method of feeding back a preferred index after indexing matrix precoders.

When some feedback information is partitioned in units composed of partitions and/or values for linking partitions, pilot signals transmitted from the eNB to the UE may be linked with a specific set of antenna ports. Such a set of pilot signals is referred to as a pilot pattern. As a representative pilot pattern, there is a non-zero-power (NZP) CSI-RS resource (or process) which is a measurement pilot used in an LTE system. For example, the following mapping relationship between partition, CSI-RS and PMI feedback may be defined.

A. Aligned Unit of Partition, Pilot Pattern and PMI Feedback 1. (Partition) In a system composed of 16 antenna ports, the eNB configures two partitions each including eight antenna ports and performs partitioned precoding.

2. (Pilot pattern) In order to support partitioned precoding, the eNB allocates and transmits 8tx NZP CSI-RS resources to each partition, that is, configures two co-located NZP CSI-RS resources with respect to the UE.

3. (PMI feedback) The UE feeds back PMI1, PMI2 and linking coefficient values for linking PMI1 and PMI2 (e.g., PMI3 of the linking precoder) of the two antenna port partitions.

That is, when a separate NP CSI-RS resource is allocated to each antenna port partition, the eNB may configure a plurality of NZP CSI-RS resources to the UE with respect to a plurality of co-located (or synchronized) antenna port partitions belonging to one eNB (or transmission point). At this time, in order to distinguish between a non-co-located antenna port pattern used for CoMP transmission and the co-located antenna port patterns, the eNB may inform the UE of co-location between NZP CSI-RS resources. For example, the eNB may inform the UE of a quasi-co-location (QCL) condition among a plurality of NZP CSI-RS resources.

A pilot transmission unit and an antenna port partition unit may not be identical. For example, in a state of configuring one 8tx CSI-RS resource, the UE may configure feedback information of two 4tx partitions. In addition, an antenna port partition unit and a feedback unit may not be identical. In particular, in case of aligned partitioned precoding, common PPI feedback information may be fed back with respect to the partitions, to which the same precoding is applied, and thus one feedback unit may be configured with respect to a plurality of partitions.

B. Not Aligned Unit of Partition, Pilot Pattern & PMI Feedback 1. (Partition) It is assumed that antenna port partitioning is equal to that of FIG. 18.

2. (PMI feedback) Feedback information is composed of a PPI, which is commonly applicable to all partitions (hereinafter, common PPI) in consideration of perfectly aligned partitioned precoding, and linking coefficient values. In this case, the partition unit and the feedback unit may be regarded as different.

Figure 20:
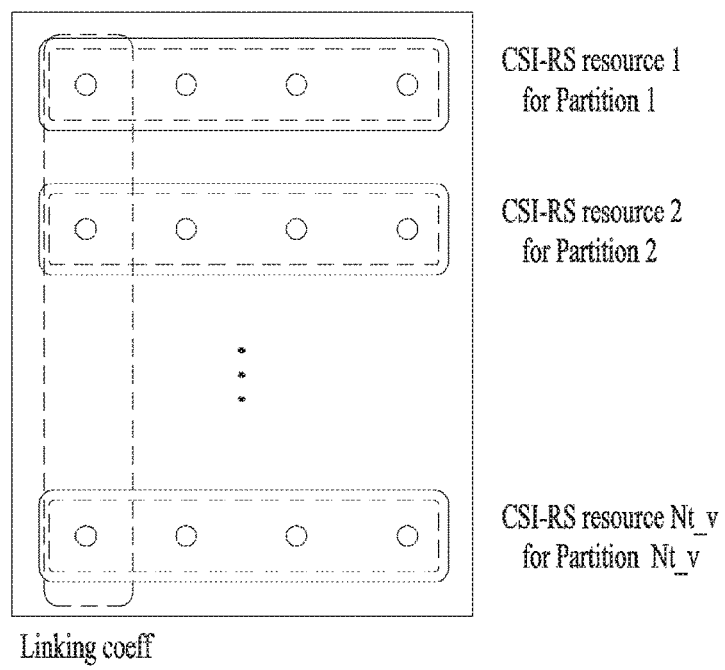
FIGS. 20 to 22 illustrate pilot pattern allocation methods.
Figure 21:
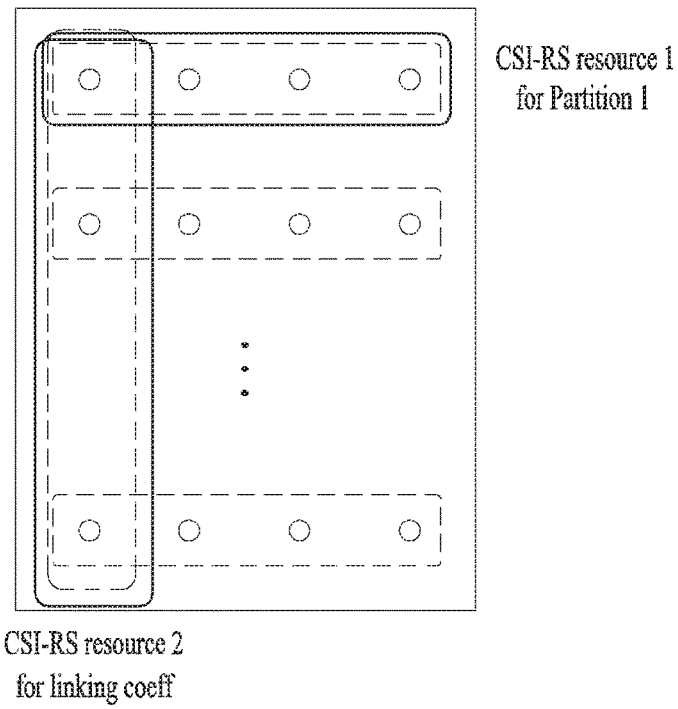
Figure 22:
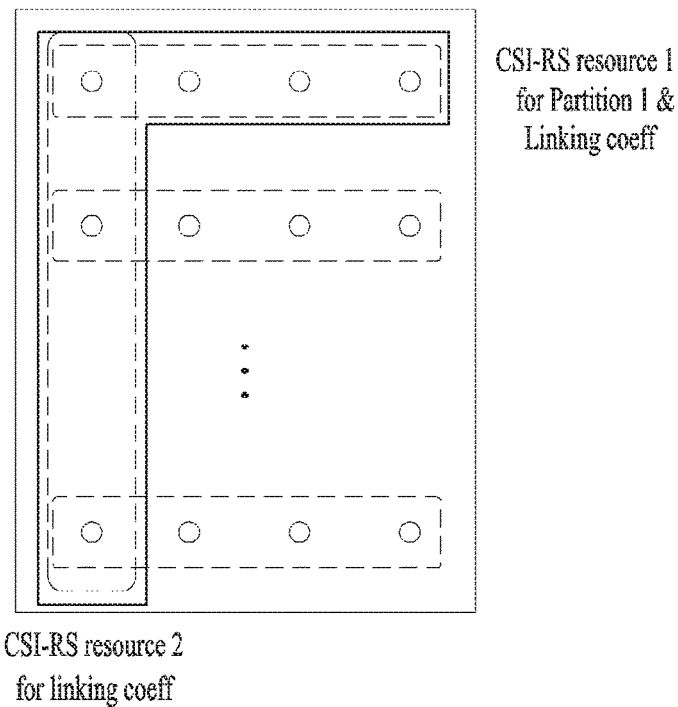

3. (Pilot pattern) Various pilot pattern allocation methods may be used. FIGS. 20 to 22 show pilot pattern allocation methods. More specifically, as shown in FIG. 20, a separate pilot resource may be configured per partition. As shown in FIG. 21, one pilot pattern may be transmitted via a first partition such that the UE calculates a common PPI and one pilot pattern may be transmitted to antenna ports, to which the linking precoder is applied, such that the UE calculates linking coefficient values. Alternatively, as shown in FIG. 22, only one pilot pattern may be configured such that the UE simultaneously calculates the common PPI and the linking coefficients.

As described above, in order to support closed loop MIMO precoding, a UE should transmit a pilot or feedback information. In general, in a frequency division duplexing (FDD) system, since uplink and downlink frequency bands are different, a method of, at a UE, transmitting a pilot and estimating a downlink channel of an eNB using channel reciprocity between uplink and downlink is not suitable. Thus, feedback information is preferably configured and transmitted.

Feedback information may be divided into explicit information and implicit information and preferred precoder index (PPI) type implicit information is mainly used in consideration of feedback overhead. In order to support closed loop partitioned precoding through implicit feedback, PPI information for a partitioned precoder and PPI information for a linking precoder may be configured as feedback information.

On the assumption of perfectly aligned precoding in which all partitioned precoders are equally configured, as shown in FIG. 20, in consideration of the case where a separate pilot pattern is transmitted in each antenna port partition, the UE may configure feedback information as follows:

1) a PPI which will be commonly applied to pilot patterns between which a QCL assumption is possible 2) linking coefficient information for linking PPIs for pilot patterns between which a QCL assumption is possible (e.g., PPIs for linking precoders)

3) a rank indicator (RI)

4) a CQI when 1) to 3) are applied.

As described above, the pilot pattern may be interpreted as an NZP CSI-RS resource or a CSI process in an LTE system. That is, in the LTE system, one pilot pattern may mean (1) one NZP CSI-RS resource, (2) one CSI process or (3) one NZP CSI-RS resource included in one CSI process. In particular, in the case of (3), only one NZP CSI-RS resource may be included in a CSI process as in the LTE system or a plurality of NZP CSI-RS resources may be included in one CSI process. The PPI may be expressed as a PMI if a precoder is configured in a matrix.

The configuration of the above-described feedback information is selectively applicable to pilot patterns transmitted by the UE at the same transmission point such that a QCL assumption there between is possible. Examples of a method of, at a UE, determining whether a QCL assumption is possible between a plurality of pilot patterns will now be described.

1. An eNB may explicitly or implicitly notify a UE of whether a QCL assumption between pilot patterns is possible.

For example, an indicator indicating whether a QCL assumption is possible may be included in a plurality of NZP CSI-RS resources or a plurality of CSI processes or information about NZP CSI-RS resources, between which a QCL assumption is possible, may be separately indicated via RRC signaling. Additionally, the UE may regard a QCL assumption between a plurality of NZP-RS resources included in a single CSI process as being possible. In this case, the eNB may configure NZP CSI-RS resources, between which a QCL assumption is possible, in a single CSI process.

2. Alternatively, the UE may autonomously determine whether a QCL assumption between pilot patterns is possible.

For example, a difference in reception timing offset between the pilot patterns may be calculated to determine whether a QCL assumption is possible. More specifically, if the difference in reception timing offset is within a threshold, it may be determined that the QCL assumption between pilot patterns is possible. Alternatively, whether the QCL assumption is possible may be determined using the properties of channels estimated using the pilot patterns. More specifically, when the properties of the estimated channels are similar, it may be determined that the QCL assumption between pilot patterns is possible.

The UE may calculate the above-described information 1), that is, the PPI which will be commonly applied to pilot patterns, between which a QCL assumption is possible, using one of the following methods.

A) A common PPI, which will be commonly applied to channels estimated using the pilot patterns and candidates of linking coefficients, are all applied and a set of a common PPI and a linking coefficient having maximum performance is selected. That is, the information 1) and the information 2) are simultaneously calculated.

B) Next, a method for first applying a phase difference between pilot patterns to a linking coefficient and then averaging channels estimated using the pilot patterns to calculate a PPI for an average channel may also be considered.

C) Lastly, a PPI for each pilot pattern may be calculated first and a final common PPI may be further calculated. Here, various methods may be used to obtain the common PPI from the PPIs for the pilot patterns. For example, a PPI closest to an average value of the PPIs or a PPI having a channel estimate with highest reliability may be calculated as a common PPI.

When the UE calculates the information 2), the information 1) and the information 2) may be simultaneously calculated as in A) or a common PPI may be calculated first and then a linking coefficient for optimizing performance of the common PPI may be calculated. Alternatively, as in B), a linking coefficient may be calculated first based on channels estimated using a first pilot of each pilot pattern and then a common PPI may be calculated. Alternatively, the common PPI and the linking coefficient may be independently calculated.

Additionally, when the information 3), that is, the RI, is calculated, the information 1) and 2) optimized according to each rank may be calculated and then an RI for optimizing performance may be selected. Of course, the information 4) means a CQI value, to which the finally selected information 1) to 3) is applied.

When pilot patterns are transmitted in a row or column direction in a two-dimensional (2D) array environment, the information 1) and the information 2) may be replaced with a PPI for horizontal beamforming and a PPI for vertical beamforming, respectively. Of course, the information 1) and the information 2) may be applied as a PPI for vertical beamforming and a PPI for horizontal beamforming, respectively.

Similarly, on the assumption of perfectly aligned precoding in which all partitioned decoders are equally configured, as shown in FIG. 21, if a separate pilot pattern is transmitted in each antenna port partition, the UE may configure feedback information as follows:

(1) a PPI to be applied to each pilot pattern (2) a rank indicator (RI)

(3) a CQI when (1) and to (2) are applied.

In this case, the UE may detect a PPI set optimized for each rank, compare transmission performances of the PPIs and calculate an optimal rank, in order to calculate the information (2).

The foregoing CSI-RS transmission methods and their respective related CSI feedback information configuration methods are applicable irrespective of whether BS antennas are polarized, which will be described with reference to the attached drawings.

FIGS. 23 to 26 illustrate examples of applying the conventional CSI feedback information configuration methods to polarized antennas. Particularly, FIGS. 23 to 26 are based on the assumption that the number of antenna port rows (M) is 4, the number of antenna port columns (N) is 4, and a polarization dimension (P) is 2.

Figure 23:
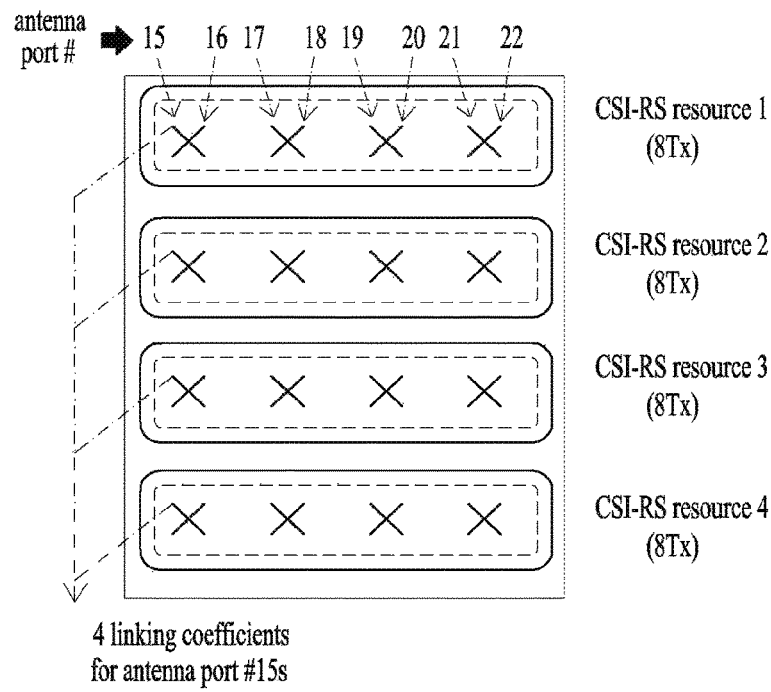
FIGS. 23 to 26 illustrate examples of applying conventional CSI feedback information configuration methods to polarized antennas.
Figure 24:
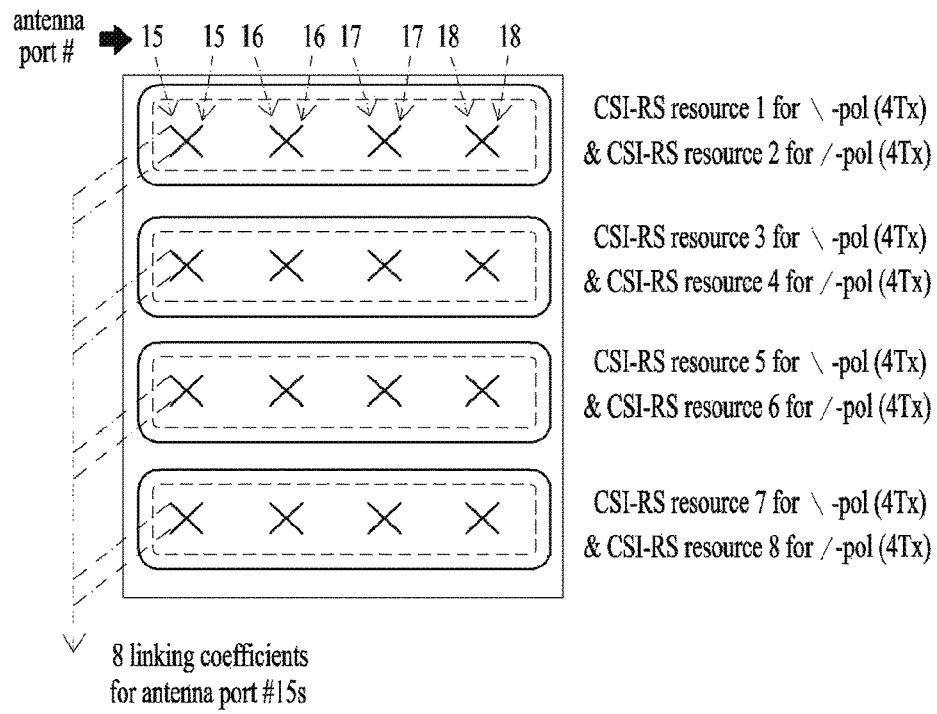
Figure 25:
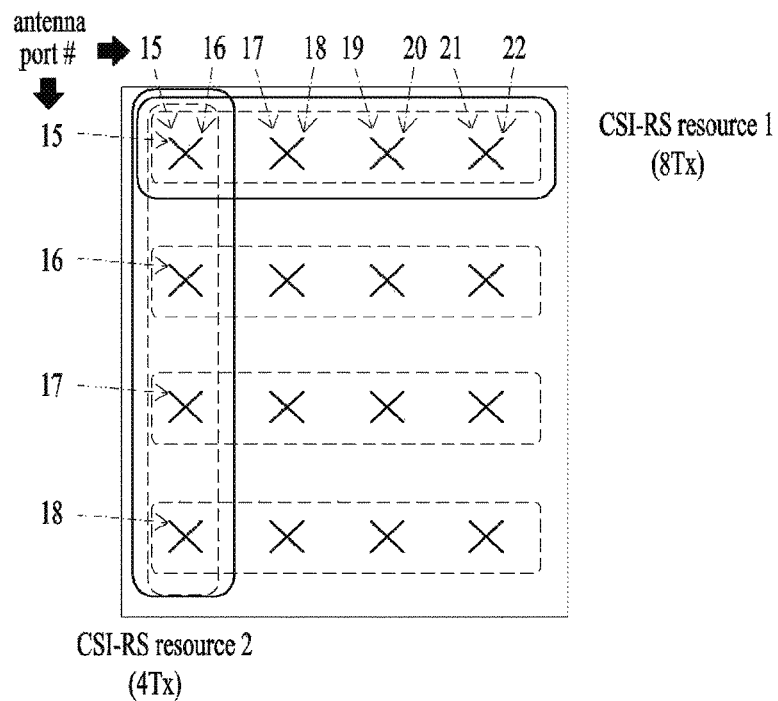
Figure 26:
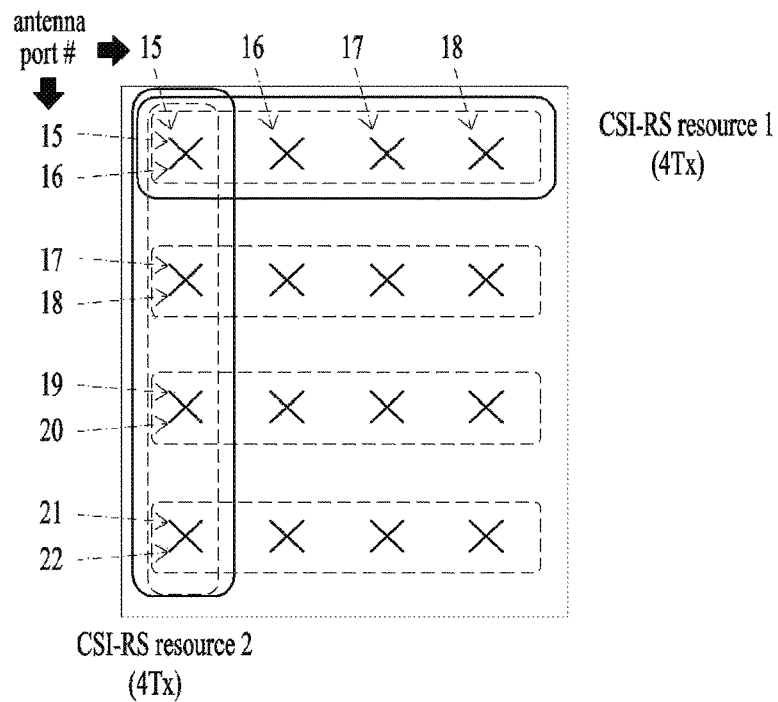

The CSI-RS transmission method illustrated in FIG. 20 is applicable in the manners illustrated in FIGS. 23 and 24 (RS Case 1), and the CSI-RS transmission method illustrated in FIG. 21 is applicable in the manners illustrated in FIGS. 25 and 26 (RS Case 2). Particularly, all antenna ports included in a row form one partition in FIGS. 23 and 25, whereas only specific antenna ports included in a row form one partition in FIGS. 24 and 26.

That is, for a planar antenna array configured in the form of (M, N, P), precoders may be configured in consideration of M×P as the number of horizontal antenna ports and N as the number of vertical antenna ports, or in consideration of M as the number of horizontal antenna ports and N×P as the number of vertical antenna ports. In the former case, the number of Tx antennas for an H-PMI as feedback information is M×P and the number of Tx antennas for a V-PMI is N, whereas in the latter case, the number of Tx antennas for an H-PMI is M and the number of Tx antennas for a V-PMI is N×P.

In RS Case 1 illustrated in FIGS. 23 and 24, a total of N M×P Tx NZP CSI-RS resources or a total of N×P M Tx NZP CSI-RS resources are transmitted. In this case, a UE may calculate and report a CSI feedback in the same manner as for the foregoing feedback information type 1.

In RS Case 2 illustrated in FIGS. 25 and 26, M×P Tx NZP CSI-RS resources and N Tx NZP CSI-RS resources are transmitted respectively, or M Tx NZP CSI-RS resources and N×P Tx NZP CSI-RS resources are transmitted respectively. In this case, the UE may calculate and report a CSI feedback in the same manner as for the foregoing feedback information type 2.

Meanwhile, a polarized antenna-based precoder is designed by considering polarization characteristics and linear array characteristics separately in many cases. It is known that this method advantageously increases performance relative to feedback overhead by separating a codebook for polarized antennas from a codebook for linear array antennas. As described before with reference to [Equation 8], [Equation 9], and [Equation 10], an 8 Tx PMI codebook introduced to the LTE Rel-10 system was designed to be the product between two precoding matrices W1 reflecting ULA characteristics and W2 reflecting cross polarization characteristics. While only long-term feedback and/or wideband feedback is supported for W1, short-term feedback and/or subband feedback is supported for W2. In this manner, performance may be improved, while total PMI feedback overhead is kept small. The design principle is based on the observation result that channels of a ULA with different polarizations are similar to each other except for phases, which will be described with reference to the attached drawings.

Figure 27:
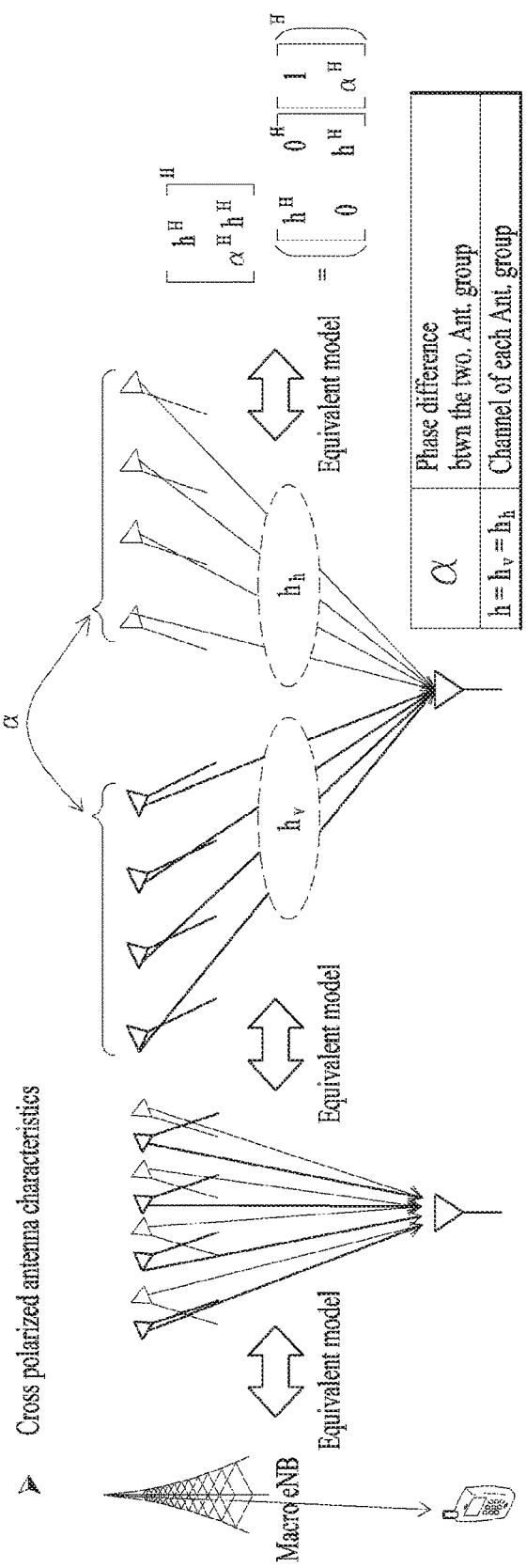
FIG. 27 illustrates characteristics of cross-polarized antennas.

FIG. 27 illustrates characteristics of cross-polarized antennas.

Referring to FIG. 27, once a BS (transmitter) has knowledge of information about a precoder reflecting ULA antenna channels for the same polarization, and information about the phase difference between antenna channels having different polarizations, the BS may configure precoders. In extension to 2D planar antennas, only if the BS has precoder information (VL-PMI) reflecting vertical ULA channels for the same polarization, precoder information (HL-PMI) reflecting horizontal ULA channels for the same polarization, and phase difference information (X-PMI) to be applied between antennas having different polarizations, the BS may configure precoders.

For example, if P=2, for a specific polarized antenna group, a Three-Dimensional (3D) MIMO precoder, that is, a final precoder W may be configured with the Khatri-Rao product (column-wise Kronecker product) between a matrix indicated by a VL-PMI and a matrix indicated by an HL-PMI, while for the other polarization antenna group, a 3D MIMO precoder may be configured only by compensating for the phase difference (e.g., $\exp(j\theta)$) between polarized antenna channels.

Based on the above-described antenna characteristics, descriptions will be given of a pilot resource overhead reduction method, a CSI process configuration method, and a feedback information configuration method.

First of all, a BS transmits pilots using N Tx CSI-RS resources and M Tx CSI-RS resources respectively selected from a specific antenna row and column. In this case, two NZP CSI-RS resources are mapped to different polarizations, and more particularly, the two NZP CSI-RS resources are mapped to different polarization antennas located at the same antenna position. In addition, the BS allocates the two NZP CSI-RS resources for a UE and signals whether there is a cross-polarization in a BS antenna configuration either explicitly or implicitly.

After receiving this, the UE feedbacks, to the BS, the following information:

1) A PPI to be applied to a first NZP CSI-RS resource where the QCL assumption can be applied;

2) A PPI to be applied to a second NZP CSI-RS resource where the QCL assumption can be applied;

3) Information on a phase difference between specific antenna ports included in different NZP CSI-RS resources where the QCL assumption can be applied (X-PMI);

4) An RI; and

5) A CQI obtained when the above information 1) to 4) is applied.

Figure 28:
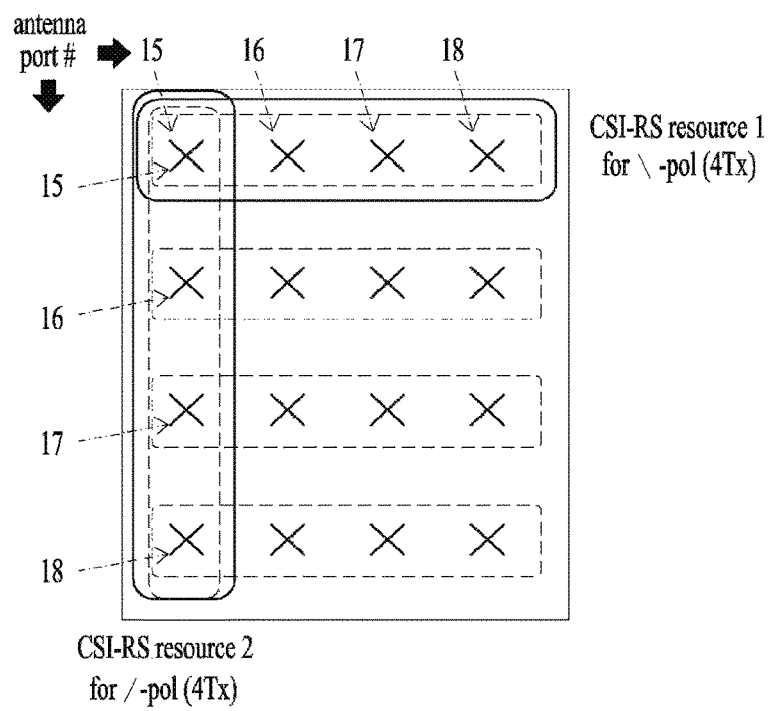
FIG. 28 illustrates an example of configuring a CSI-RS as a Pol-RS according to an embodiment of the present disclosure.

FIG. 28 illustrates an example in which a Pol-RS is implemented as a CSI-RS according to an embodiment of the present invention. Particularly, it is assumed in FIG. 28 that the number of antenna port rows, the number of antenna port columns, and a polarization dimension is 4, 4, and 2, respectively. Referring to FIG. 28, a pilot is transmitted using 4 Tx NZP CSI-RS resources corresponding to different polarizations of a specific row and column.

According to the present invention, RS overhead can be significantly reduced compared to the CSI-RS transmission scheme described with reference to FIGS. 25 and 26. That is, in the scheme of FIGS. 25 and 26, pilots are respectively transmitted in all 12 (=4+8) antenna ports whereas it is possible to obtain the similar performance using only 8 (=4+4) antenna ports according to the scheme of FIG. 28.

The present invention is based on the fact that channel measurement results between different polarization antennas located at the same position is highly likely to be similar to each other irrespective of an antenna position. For example, a channel phase difference between polarization antennas of the antenna port located at the [1,1] position, i.e., the first row and column is highly likely to be similar to that between polarization antennas located at [i,j] positions (where i=1, . . . , 4 and j=1, . . . , 4).

Thus, if the BS is aware of information on such a phase difference, the number of Tx antennas can be increased by reflecting the above-mentioned result when a 3D MIMO precoder is configured. In addition, in the embodiment of FIG. 28, phase difference information can be measured by comparing channel estimation values of antenna port #15 of CSI-RS resource 1 and antenna port #15 of CSI-RS resource 2.

A CSI process based on the above-described pilot configuration can be configured as shown in Table 6 below.

TABLE 6

NZP CSI-RS resource #1 (N port)
NZP CSI-RS resource #2 (M port)
X-PMI triggering message
Other configuration information (e.g., information
for reporting ZP CSI-RS, CSI-IM, PUCCH/PUSCH, etc.)

In Table 6, the X-PMI triggering message is an example of implicitly signaling whether there is a cross-polarization in a BS antenna. When the UE receives the X-PMI triggering message, the UE feedbacks X-PMI between polarization antennas. Otherwise, the UE does not feedback the X-PMI by assuming a single polarization antenna (i.e., P=1).

Instead of the X-PMI triggering message, whether there is a cross-polarization can be explicitly signaled. That is, when configuring two NZP CSI-RS resources, the BS may inform the UE of whether there is an X-Pol. When the X-Pol is present, the UE feedbacks the X-PMI. Otherwise, the UE does not feedback the X-PMI.

The X-PMI triggering message may not be included in a higher layer message shown in Table 6. Instead, it can be included in downlink control information (DCI) transmitted through a PDCCH and the like. For example, after an X-PMI feedback configuration (e.g., PUSCH reporting mode) is set through RRC layer signaling in advance, the corresponding feedback may be dynamically triggered through the DCI. When the X-PMI triggering message is included in an RRC message, the UE may periodically feedback the X-PMI value. On the other hand, when the X-PMI triggering message is included in the DCI, the UE may aperiodically feedback the X-PMI value.

In addition, the X-PMI feedback may be measured with reference to a specific antenna port set included in two different CSI-RS resources. For example, in FIG. 28, the X-PMI may be measured with reference to 2 Tx antennas, which are configured using the antenna port #15 of the CSI-RS resource 1 and the antenna port #15 of the CSI-RS resource 2.

if P=2, for feedback information about the X-PMI,
I. a legacy 2Tx codebook may be used or a new dedicated codebook may be designed,
II. the quantized value of a relative phase difference of the other polarized antenna with respect to one polarized antenna may be used, or
III. a pair of the X-PMI and the VL-PMI or a pair of the X-PMI and the HL-PMI may be mapped to a legacy 4Tx or 8Tx precoder generation scheme.

Particularly in method III, the X-PMI corresponds to W2 which is a subband PMI of a dual codebook structure, and the VL-PMI or HL-PMI paired with the X-PMI corresponds to W1 which is a wideband PMI, in the legacy LTE system. In this case, the UE may configure feedback information so that the product between a matrix indicated by the VL-PMI and a matrix indicated by the X-PMI may form the V-PMI, or the product between a matrix indicated by the HL-PMI and the matrix indicated by the X-PMI may form the H-PMI.

If the product between the matrix indicated by the VL-PMI and the matrix indicated by the X-PMI forms the V-PMI as in the former case, the relationship illustrated in [Table 7] is established.

TABLE 7

X-PMI = subband V-PMI (W2 for V-PMI)
VL-PMI = wideband V-PMI (W1 for V-PMI)
HL-PMI = H-PMI In this case, the matrices indicated by the respective PMIs have the following sizes.
X-PMI: (the number of rows in W2, determined according to rank)×(rank)
VL-PMI: (P·M)×(the number of columns in W1, determined according to rank)
HL-PMI: (N)×(rank)

For reference, if the rank is 1 or 2, each of the number of columns in W1 and the number of rows in W2 is 8 for an 8Tx codebook in the LTE system. If the rank is 3 or 4, each of the number of columns in W1 and the number of rows in W2 is 16. Further, if the rank is 5 to 8, each of the number of columns in W1 and the number of rows in W2 is 8.

If the product between the matrix indicated by the HL-PMI and the matrix indicated by the X-PMI forms the H-PMI as in the latter case, the relationship illustrated in [Table 8] is established.

TABLE 8

X-PMI = subband H-PMI (W2 for H-PMI)
VL-PMI = V-PMI
HL-PMI = wideband H-PMI (W1 for H-PMI)

In this case, the matrices indicated by the respective PMIs have the following sizes.
X-PMI: (the number of rows in W2, determined according to rank)×(rank)
VL-PMI: (M)×(rank)
HL-PMI: (P·N)×(the number of columns in W1, determined according to rank)

Meanwhile, if a legacy 2Tx codebook is used as in Method I or the quantized value of a relative phase difference of the other polarized antenna with respect to one polarized antenna is used as in Method II, the matrices indicated by the respective PMIs may have the following sizes.
X-PMI: (P or P−1)×(1)
VL-PMI: (M)×(rank)
HL-PMI: (N)×(rank)

In this case, for a specific polarized antenna group, a 3D MIMO precoder, that is, W may be configured with the Khatri-Rao product (column-wise Kronecker product) between the matrix indicated by the VL-PMI and the matrix indicated by the HL-PMI, while for the other polarization antenna group, a 3D MIMO precoder may be configured only by compensating for the phase difference (e.g., $\exp(j\theta)$) between polarized antenna channels. The phase difference is signaled by the X-PMI.

While it is assumed in the present disclosure that a 3D MIMO codebook is configured with the Khatri-Rao product between a V-PMI and an H-PMI, a 3D MIMO codebook may be configured with the (matrix) Khatri-Rao product between the V-PMI and the H-PMI on the assumption that a vertical rank is 1 in consideration of overhead (herein, the V-PMI corresponds to a vector of a size being the number of vertical antennas×1). This modeling scheme is equivalent to Khatri-Rao product representation by setting all column vectors of the V-PMI to be equal. That is, $v_1 = v_2 = \ldots = v_{N_s}$ in [Equation 22].

Meanwhile, since the HL-PMI and VL-PMI correspond to PMIs to be applied to two NZP CSI-RS resources, the BS can signal a mapping order for the PMIs. However, the present invention is not limited thereto. That is, the UE can configure the feedback information without receiving information indicating whether the first NZP CSI-RS resource is mapped to the HL-PMI or the VL-PMI. Specifically, the UE can configure the feedback information based on a PMI to be applied to the first NZP CSI-RS resource and a PMI to be applied to the second NZP CSI-RS resource instead of using the HL-PMI and VL-PMI.

Since the present disclosure has been described in the context of DL, it is assumed that a BS is a transmitter and a UE is a receiver, which should not be construed as limiting the present disclosure. That is, feedback information may be interpreted as information that a receiver transmits to a transmitter in a relationship between the transmitter and the transmitter. Accordingly, the present disclosure is also applicable to a UL transmission environment, a Device-to-Device (D2D) transmission environment, or the like.

Figure 29:
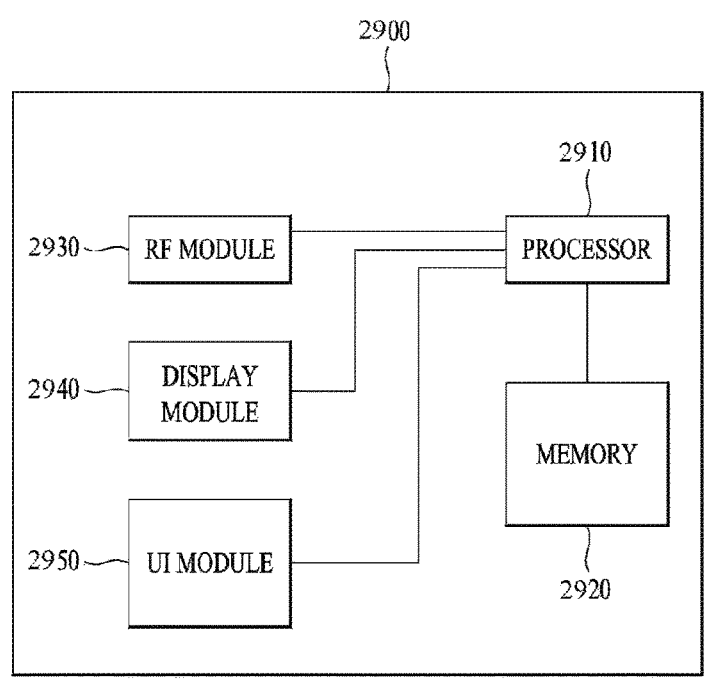
FIG. 29 is a block diagram of a communication apparatus according to an embodiment of the present disclosure.

FIG. 29 is a block diagram of a communication apparatus according to an embodiment of the present disclosure.

Referring to FIG. 29, a communication apparatus 2900 includes a processor 2910, a memory 2920, an RF module 2930, a display module 2940, and a User Interface (UI) module 2950.

The communication device 2900 is shown as having the configuration illustrated in FIG. 24, for the convenience of description. Some modules may be added to or omitted from the communication apparatus 2900. In addition, a module of the communication apparatus 2900 may be divided into more modules. The processor 2910 is configured to perform operations according to the embodiments of the present disclosure described before with reference to the drawings. Specifically, for detailed operations of the processor 2910, the descriptions of FIGS. 1 to 23 may be referred to.

The memory 2920 is connected to the processor 2910 and stores an Operating System (OS), applications, program codes, data, etc. The RF module 2930, which is connected to the processor 2910, upconverts a baseband signal to an RF signal or downconverts an RF signal to a baseband signal. For this purpose, the RF module 2930 performs digital-to-analog conversion, amplification, filtering, and frequency upconversion or performs these processes reversely. The display module 2940 is connected to the processor 2910 and displays various types of information. The display module 2940 may be configured as, not limited to, a known component such as a Liquid Crystal Display (LCD), a Light Emitting Diode (LED) display, and an Organic Light Emitting Diode (OLED) display. The UI module 2950 is connected to the processor 2910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method for configuring channel state information using polarization characteristics of an antenna in a wireless communication system and device therefor are mainly described with reference to examples applied to the 3GPP LTE system, the method and device can be applied to various kinds of wireless communication systems as well as the 3GPP LTE system.

What is claimed is:

1. A method for reporting channel state information (CSI) to a base station (BS) by a user equipment (UE) in a wireless communication system, the method comprising:

receiving, from the BS, a first reference signal (RS) for a row of a transmit (Tx) antenna array among a plurality of rows of the Tx antenna array and a second RS for a column of the Tx antenna array among a plurality of columns of the Tx antenna array, wherein the first RS is related to first antenna ports having a first polarization and the second RS is related to second antenna ports having a second polarization different from the first polarization;

obtaining a first precoder for the first RS and a second precoder for the second RS and only one cross-polarization characteristic between one of the first antenna ports and one of the second antenna ports; and reporting, to the BS, the CSI including the first precoder, the second precoder and information on the only one cross-polarization characteristic, wherein a position of the one of the first antenna ports and a position of the one of the second antenna ports are same in the Tx antenna arrays, wherein, when a difference between a reception timing of the first RS and a reception timing of the second RS is less than a threshold value, the UE receives the first RS and the second RS under an assumption that an antenna port of the first RS and an antenna port of the second RS is Quasi co-located (QCL), wherein the only one cross-polarization characteristic is information on a phase difference between the one of the first antenna ports and the one of the second antenna ports.

2. The method of claim 1, wherein the information on the only one cross-polarization characteristic is a third precoder related to a number of antenna ports at a same position in the Tx antenna array.

3. A method for receiving channel state information (CSI) from a user equipment (UE) by a base station (BS) in a wireless communication system, the method comprising:

transmitting, to the UE, a first reference signal (RS) for a row of a transmit (Tx) antenna array among a plurality of rows of the Tx antenna array and a second RS for a column of the Tx antenna array among a plurality of columns of the Tx antenna array, wherein the first RS is related to first antenna ports having a first polarization and the second RS is related to second antenna ports having a second polarization different from the first polarization; and receiving, from the UE, the CSI including a first precoder for the first RS and a second precoder for the second RS and information on only one cross-polarization characteristic between one of the first antenna ports and one of the second antenna ports, wherein a position of the one of the first antenna ports and a position of the one of the second antenna ports are same in the Tx antenna array, wherein, when a difference between a reception timing of the first RS and a reception timing of the second RS is less than a threshold value, the UE receives the first RS and the second RS under an assumption that an antenna port of the first RS and an antenna port of the second RS is Quasi co-located (QCL), wherein the only one cross-polarization characteristic is information on a phase difference between the one of the first antenna ports and the one of the second antenna ports.

4. The method of claim 3, wherein the information on the only one cross-polarization characteristic is a third precoder related to a number of antenna ports at a same position in the Tx antenna array.

* * * * *